United States Patent
Nathan et al.

(10) Patent No.: US 8,037,412 B2
(45) Date of Patent: Oct. 11, 2011

(54) PAY-PER-PLAY AUDIOVISUAL SYSTEM WITH TOUCH SCREEN INTERFACE

(75) Inventors: Guy Nathan, Yerres (FR); Tony Mastronardi, Pierrefonds (CA)

(73) Assignee: TouchTunes Music Corporation, New York, NY (US)

( * ) Notice: Subject to any disclaimer, the term of this patent is extended or adjusted under 35 U.S.C. 154(b) by 715 days.

(21) Appl. No.: 10/196,258

(22) Filed: Jul. 17, 2002

(65) Prior Publication Data

US 2003/0031096 A1 Feb. 13, 2003

Related U.S. Application Data

(63) Continuation of application No. 08/817,968, filed as application No. PCT/FR95/01335 on Oct. 12, 1995, now abandoned.

(30) Foreign Application Priority Data

Oct. 12, 1994 (WO) .................. PCT/FR94/01185

(51) Int. Cl.
 *G06F 3/00* (2006.01)
(52) U.S. Cl. ........ 715/716; 715/702; 715/719; 715/722; 715/764; 715/781; 715/786; 84/609
(58) Field of Classification Search .................. 715/716, 715/702, 719, 722, 764, 781, 786, 874; 84/609
See application file for complete search history.

(56) References Cited

U.S. PATENT DOCUMENTS

| | | | |
|---|---|---|---|
| 3,807,541 A | 4/1974 | Kortenhaus | |
| 3,982,620 A | 9/1976 | Kortenhaus | |
| 4,008,369 A | 2/1977 | Theurer et al. | |
| 4,186,438 A | 1/1980 | Benson et al. | |
| 4,232,295 A | 11/1980 | McConnell | |
| 4,335,809 A | 6/1982 | Wain | |
| 4,335,908 A | 6/1982 | Burge | |
| 4,356,509 A | 10/1982 | Skerlos et al. | |

(Continued)

FOREIGN PATENT DOCUMENTS

DE 3406058 8/1985

(Continued)

OTHER PUBLICATIONS

"Darts Revolution Again", Replay Magazine, Mar. 1991, pp. 146-148.

(Continued)

*Primary Examiner* — Simon Ke
(74) *Attorney, Agent, or Firm* — Nixon & Vanderhye PC

(57) ABSTRACT

An audiovisual reproduction system triggered by payment from a user is developed around a microprocessor device. The system includes memory containing, in compressed digital form, audio and visual information, and a display and digital audio reproduction unit, for creating a multimedia environment. The display includes a video monitor and an interactive user interface which reacts to external events and translates the external events for a multitasking operating system as events activating, via a graphical module of a library of integrated tools and services, a display of windows or frames providing control of physical operating parameters of the audiovisual reproduction system. The external events includes at least a down-event where the user contacts a representation displayed on the touch screen, selecting a parameter to modify, and an up-event where the use breaks contact with the screen, which triggers modification of the selected parameter saving these parameters in the memory.

14 Claims, 13 Drawing Sheets

U.S. PATENT DOCUMENTS

| | | | |
|---|---|---|---|
| 4,369,442 A | 1/1983 | Werth et al. | |
| 4,375,287 A | 3/1983 | Smith | |
| 4,412,292 A | 10/1983 | Sedam et al. | |
| 4,413,260 A | 11/1983 | Siegel et al. | |
| 4,521,014 A | 6/1985 | Sitrick | |
| 4,528,643 A | 7/1985 | Freeny, Jr. | |
| 4,558,413 A | 12/1985 | Schmidt | |
| 4,572,509 A | 2/1986 | Sitrick | |
| 4,577,333 A | 3/1986 | Lewis et al. | |
| 4,582,324 A | 4/1986 | Koza et al. | |
| 4,588,187 A | 5/1986 | Dell | |
| 4,593,904 A | 6/1986 | Graves | |
| 4,597,058 A | 6/1986 | Izumi et al. | |
| 4,636,951 A | 1/1987 | Harlick | |
| 4,652,998 A | 3/1987 | Koza et al. | |
| 4,654,799 A | 3/1987 | Ogaki et al. | |
| 4,658,093 A | 4/1987 | Hellman | |
| 4,667,802 A | 5/1987 | Verduin et al. | |
| 4,674,055 A * | 6/1987 | Ogaki et al. | 700/234 |
| 4,675,538 A | 6/1987 | Epstein | |
| 4,677,311 A | 6/1987 | Morita | |
| 4,677,565 A | 6/1987 | Ogaki | |
| 4,703,465 A | 10/1987 | Parker | |
| 4,704,725 A | 11/1987 | Harvey et al. | |
| 4,707,804 A | 11/1987 | Leal | |
| 4,722,053 A | 1/1988 | Dubno et al. | |
| 4,761,684 A | 8/1988 | Clark et al. | |
| 4,766,581 A | 8/1988 | Korn et al. | |
| 4,787,050 A | 11/1988 | Suzuki | |
| 4,792,849 A | 12/1988 | McCalley | |
| 4,807,052 A | 2/1989 | Amano | |
| 4,811,325 A | 3/1989 | Sharples, Jr. et al. | |
| 4,814,972 A | 3/1989 | Winter et al. | |
| 4,825,054 A | 4/1989 | Rust | |
| 4,829,570 A | 5/1989 | Schotz | |
| 4,852,154 A | 7/1989 | Lewis et al. | |
| 4,857,714 A | 8/1989 | Sunyich | |
| 4,868,832 A | 9/1989 | Marrington | |
| 4,885,694 A * | 12/1989 | Pray et al. | 705/400 |
| 4,905,279 A | 2/1990 | Nishio | |
| 4,920,432 A * | 4/1990 | Eggers et al. | 386/96 |
| 4,922,420 A | 5/1990 | Nakagawa et al. | |
| 4,924,378 A | 5/1990 | Hershey | |
| 4,926,485 A | 5/1990 | Yamashita | |
| 4,937,807 A | 6/1990 | Weitz et al. | |
| 4,949,187 A | 8/1990 | Cohen | |
| 4,953,159 A | 8/1990 | Hayden et al. | |
| 4,956,768 A | 9/1990 | Sidi et al. | |
| 4,958,835 A | 9/1990 | Tashiro et al. | |
| 4,977,593 A | 12/1990 | Ballance | |
| 4,999,806 A | 3/1991 | Chernow | |
| 5,008,814 A | 4/1991 | Mathur | |
| 5,012,121 A | 4/1991 | Hammond | |
| 5,027,426 A | 6/1991 | Chiocca | |
| 5,041,921 A | 8/1991 | Scheffler | |
| 5,046,093 A | 9/1991 | Wachob | |
| 5,053,758 A | 10/1991 | Cornett et al. | |
| 5,058,089 A | 10/1991 | Yoshimaru et al. | |
| 5,077,607 A | 12/1991 | Johnson et al. | |
| 5,081,534 A | 1/1992 | Geiger et al. | |
| 5,101,499 A | 3/1992 | Streck et al. | |
| 5,106,097 A | 4/1992 | Levine | |
| 5,117,407 A | 5/1992 | Vogel | |
| 5,138,712 A | 8/1992 | Corbin | |
| 5,148,159 A | 9/1992 | Clark et al. | |
| 5,155,847 A | 10/1992 | Kirouac | |
| 5,163,131 A | 11/1992 | Row | |
| 5,166,886 A | 11/1992 | Molnar | |
| 5,172,413 A | 12/1992 | Bradley et al. | |
| 5,180,309 A | 1/1993 | Egnor | |
| 5,189,630 A | 2/1993 | Barstow et al. | |
| 5,191,573 A | 3/1993 | Hair | |
| 5,191,611 A | 3/1993 | Lang | |
| 5,192,999 A | 3/1993 | Graczyk | |
| 5,197,094 A | 3/1993 | Tillery | |
| 5,203,028 A | 4/1993 | Shiraishi | |
| 5,210,854 A | 5/1993 | Beaverton et al. | |
| 5,214,761 A | 5/1993 | Barrett et al. | |
| 5,222,134 A | 6/1993 | Waite et al. | |
| 5,228,015 A * | 7/1993 | Arbiter et al. | 369/30.03 |
| 5,237,157 A * | 8/1993 | Kaplan | 235/375 |
| 5,237,322 A | 8/1993 | Heberle | |
| 5,239,480 A | 8/1993 | Huegel | |
| 5,250,747 A | 10/1993 | Tsumura | |
| 5,252,775 A | 10/1993 | Urano | |
| 5,260,999 A | 11/1993 | Wyman | |
| 5,261,104 A | 11/1993 | Bertram et al. | |
| 5,262,875 A | 11/1993 | Mincer | |
| 5,276,866 A | 1/1994 | Paolini | |
| 5,278,904 A | 1/1994 | Servi | |
| 5,282,028 A | 1/1994 | Johnson et al. | |
| 5,289,476 A | 2/1994 | Johnson et al. | |
| 5,289,546 A | 2/1994 | Hetherington | |
| 5,315,161 A | 5/1994 | Robinson | |
| 5,315,711 A | 5/1994 | Barone et al. | |
| 5,319,455 A | 6/1994 | Hoarty et al. | |
| 5,321,846 A | 6/1994 | Yokota et al. | |
| 5,327,230 A | 7/1994 | Dockery | |
| 5,339,095 A | 8/1994 | Redford | |
| 5,339,413 A | 8/1994 | Koval | |
| 5,341,350 A * | 8/1994 | Frank et al. | 710/48 |
| 5,355,302 A | 10/1994 | Martin et al. | |
| 5,357,276 A | 10/1994 | Banker | |
| 5,369,778 A | 11/1994 | San Soucie | |
| 5,375,206 A | 12/1994 | Hunter | |
| 5,386,251 A | 1/1995 | Movshovich | |
| 5,389,950 A | 2/1995 | Bouton | |
| 5,404,505 A | 4/1995 | Levinson | |
| 5,406,634 A | 4/1995 | Anderson et al. | |
| 5,408,417 A | 4/1995 | Wilder | |
| 5,410,326 A | 4/1995 | Goldstein | |
| 5,410,703 A | 4/1995 | Nilsson et al. | |
| 5,418,713 A | 5/1995 | Allen | |
| 5,420,923 A | 5/1995 | Beyers | |
| 5,428,252 A | 6/1995 | Walker | |
| 5,428,606 A | 6/1995 | Moskowitz | |
| 5,431,492 A | 7/1995 | Rothschild et al. | |
| 5,440,632 A | 8/1995 | Bacon et al. | |
| 5,444,499 A | 8/1995 | Saitoh | |
| 5,445,295 A * | 8/1995 | Brown | 221/3 |
| 5,455,619 A | 10/1995 | Truckenmiller et al. | |
| 5,455,926 A | 10/1995 | Keele | |
| 5,457,305 A | 10/1995 | Akel | |
| 5,465,213 A | 11/1995 | Ross | |
| 5,467,326 A | 11/1995 | Miyashita et al. | |
| 5,469,370 A | 11/1995 | Ostrover et al. | |
| 5,469,573 A | 11/1995 | McGill et al. | |
| 5,471,576 A | 11/1995 | Yee | |
| 5,475,835 A | 12/1995 | Hickey | |
| 5,481,509 A * | 1/1996 | Knowles | 386/117 |
| 5,487,167 A | 1/1996 | Dinallo et al. | |
| 5,489,103 A | 2/1996 | Okamoto | |
| 5,495,610 A | 2/1996 | Shing | |
| 5,496,178 A | 3/1996 | Back | |
| 5,499,921 A | 3/1996 | Sone | |
| 5,511,000 A | 4/1996 | Kaloi | |
| 5,513,117 A | 4/1996 | Small | |
| 5,515,173 A | 5/1996 | Mankovitz et al. | |
| 5,519,435 A | 5/1996 | Anderson | |
| 5,519,457 A | 5/1996 | Nishigaki et al. | |
| 5,521,631 A | 5/1996 | Budow et al. | |
| 5,521,918 A | 5/1996 | Kim | |
| 5,521,922 A | 5/1996 | Fujinami et al. | |
| 5,523,781 A | 6/1996 | Brusaw | |
| 5,528,732 A * | 6/1996 | Klotz, Jr. | 358/1.6 |
| 5,532,734 A | 7/1996 | Goertz | |
| 5,546,039 A | 8/1996 | Hewitt et al. | |
| 5,548,729 A | 8/1996 | Akiyoshi | |
| 5,550,577 A | 8/1996 | Verbiest | |
| 5,554,968 A | 9/1996 | Lee | |
| 5,555,244 A | 9/1996 | Gupta | |
| 5,557,541 A | 9/1996 | Schulhof | |
| 5,557,724 A | 9/1996 | Sampat et al. | |
| 5,559,505 A | 9/1996 | McNair | |
| 5,559,549 A | 9/1996 | Hendricks | |
| 5,561,709 A | 10/1996 | Remillard | |
| 5,565,908 A | 10/1996 | Ahmad | |

| | | | | | |
|---|---|---|---|---|---|
| 5,566,237 A | 10/1996 | Dobbs | 5,802,599 A | 9/1998 | Cabrera |
| 5,570,363 A | 10/1996 | Holm | 5,805,804 A | 9/1998 | Laursen et al. |
| 5,578,999 A | 11/1996 | Matsuzawa et al. | 5,808,224 A | 9/1998 | Kato |
| 5,579,404 A | 11/1996 | Fielder et al. | 5,809,246 A | 9/1998 | Goldman |
| 5,583,561 A | 12/1996 | Baker et al. | 5,812,643 A | 9/1998 | Schelberg et al. |
| 5,583,937 A | 12/1996 | Ullrich et al. | 5,815,146 A | 9/1998 | Youden et al. |
| 5,583,994 A | 12/1996 | Rangan | 5,825,884 A | 10/1998 | Zdepski et al. |
| 5,583,995 A | 12/1996 | Gardner et al. | 5,831,555 A | 11/1998 | Yu et al. |
| 5,592,482 A | 1/1997 | Abraham | 5,831,663 A | 11/1998 | Waterhouse et al. |
| 5,592,551 A | 1/1997 | Lett | 5,832,024 A | 11/1998 | Schotz et al. |
| 5,592,611 A | 1/1997 | Midgely et al. | 5,832,287 A | 11/1998 | Atalla |
| 5,594,509 A | 1/1997 | Florin | 5,835,843 A | 11/1998 | Haddad |
| 5,596,702 A | 1/1997 | Stucka et al. | 5,842,869 A | 12/1998 | McGregor et al. |
| 5,612,581 A | 3/1997 | Kageyama | 5,845,104 A | 12/1998 | Rao |
| 5,613,909 A | 3/1997 | Stelovsky | 5,845,256 A | 12/1998 | Pescitelli et al. |
| 5,616,876 A | 4/1997 | Cluts | 5,848,398 A | 12/1998 | Martin |
| 5,617,565 A | 4/1997 | Augenbraun et al. | 5,851,149 A | 12/1998 | Xidos et al. |
| 5,619,247 A | 4/1997 | Russo | 5,854,887 A | 12/1998 | Kindell |
| 5,619,249 A | 4/1997 | Billock et al. | 5,857,020 A | 1/1999 | Peterson |
| 5,619,250 A | 4/1997 | McClellan et al. | 5,857,707 A | 1/1999 | Devlin |
| 5,619,698 A | 4/1997 | Lillich | 5,862,324 A | 1/1999 | Collins |
| 5,623,666 A | 4/1997 | Pike | 5,864,811 A | 1/1999 | Tran et al. |
| 5,631,693 A | 5/1997 | Wunderlich et al. | 5,864,868 A | 1/1999 | Contois |
| 5,636,276 A | 6/1997 | Brugger | 5,864,870 A | 1/1999 | Guck |
| 5,638,426 A | 6/1997 | Lewis | 5,867,714 A | 2/1999 | Todd |
| 5,642,337 A | 6/1997 | Oskay | 5,870,721 A | 2/1999 | Norris |
| 5,644,714 A | 7/1997 | Kikinis | 5,880,386 A | 3/1999 | Wachi et al. |
| 5,644,766 A | 7/1997 | Coy | 5,880,769 A | 3/1999 | Nemirofsky et al. |
| 5,654,714 A | 8/1997 | Takahashi et al. | 5,884,028 A | 3/1999 | Kindell |
| 5,659,466 A | 8/1997 | Norris et al. | 5,884,298 A | 3/1999 | Smith |
| 5,661,517 A | 8/1997 | Budow et al. | 5,887,193 A | 3/1999 | Takahashi |
| 5,661,802 A | 8/1997 | Nilssen | 5,896,094 A | 4/1999 | Narisada et al. |
| 5,663,756 A | 9/1997 | Blahut et al. | 5,903,266 A | 5/1999 | Berstis et al. |
| 5,668,592 A | 9/1997 | Spaulding | 5,913,040 A | 6/1999 | Rakavy |
| 5,668,778 A | 9/1997 | Quazi | 5,914,712 A | 6/1999 | Sartain et al. |
| 5,668,788 A | 9/1997 | Allison | 5,915,094 A | 6/1999 | Kouloheris |
| 5,675,734 A | 10/1997 | Hair | 5,915,238 A | 6/1999 | Tjaden |
| 5,680,533 A | 10/1997 | Yamato et al. | 5,917,537 A | 6/1999 | Lightfoot |
| 5,684,716 A | 11/1997 | Freeman | 5,917,835 A | 6/1999 | Barrett |
| 5,689,641 A | 11/1997 | Ludwig et al. | 5,918,213 A | 6/1999 | Bernard et al. |
| 5,691,778 A | 11/1997 | Song | 5,920,700 A | 7/1999 | Gordon et al. |
| 5,691,964 A | 11/1997 | Niederlein et al. | 5,920,702 A | 7/1999 | Bleidt et al. |
| 5,696,914 A * | 12/1997 | Nahaboo et al. ............... 715/763 | 5,923,885 A | 7/1999 | Johnson |
| 5,697,844 A | 12/1997 | Von Kohorn | 5,926,531 A | 7/1999 | Petite |
| 5,703,795 A | 12/1997 | Mankovitz | 5,930,765 A | 7/1999 | Martin |
| 5,708,811 A | 1/1998 | Arendt | 5,931,908 A | 8/1999 | Gerba |
| 5,712,976 A | 1/1998 | Falcon | 5,933,090 A | 8/1999 | Christenson |
| 5,713,024 A | 1/1998 | Halladay | 5,940,504 A | 8/1999 | Griswold |
| 5,715,416 A | 2/1998 | Baker | 5,949,411 A | 9/1999 | Doerr et al. |
| 5,717,452 A | 2/1998 | Janin et al. | 5,949,688 A | 9/1999 | Montoya |
| 5,721,583 A | 2/1998 | Harada et al. | 5,953,429 A | 9/1999 | Wakai et al. |
| 5,721,815 A | 2/1998 | Ottesen et al. | 5,956,716 A | 9/1999 | Kenner |
| 5,721,829 A | 2/1998 | Dunn et al. | 5,959,869 A | 9/1999 | Miller |
| 5,724,525 A | 3/1998 | Beyers et al. | 5,959,945 A | 9/1999 | Kleiman |
| 5,726,909 A | 3/1998 | Krikorian | 5,963,916 A | 10/1999 | Kaplan |
| 5,734,719 A | 3/1998 | Tsevdos | 5,966,495 A | 10/1999 | Takahashi |
| 5,734,961 A | 3/1998 | Castille | 5,978,855 A | 11/1999 | Metz |
| 5,739,451 A | 4/1998 | Winksy et al. | 5,978,912 A | 11/1999 | Rakavy et al. |
| 5,743,745 A | 4/1998 | Reintjes | 5,980,261 A | 11/1999 | Mino et al. |
| 5,745,391 A | 4/1998 | Topor | 5,999,499 A * | 12/1999 | Pines et al. .................... 369/30.3 |
| 5,748,254 A | 5/1998 | Harrison et al. | 5,999,624 A | 12/1999 | Hopkins |
| 5,748,468 A | 5/1998 | Notenboom et al. | 6,002,720 A | 12/1999 | Yurt |
| 5,751,336 A | 5/1998 | Aggarwal et al. | 6,005,599 A | 12/1999 | Asai et al. |
| 5,757,936 A | 5/1998 | Lee | 6,008,735 A | 12/1999 | Chiloyan et al. |
| 5,758,340 A | 5/1998 | Nail | 6,009,274 A | 12/1999 | Fletcher |
| 5,761,655 A | 6/1998 | Hoffman | 6,011,758 A | 1/2000 | Dockes et al. |
| 5,762,552 A | 6/1998 | Vuong et al. | 6,018,337 A | 1/2000 | Peters |
| 5,774,527 A | 6/1998 | Handelman et al. | 6,018,726 A | 1/2000 | Tsumura |
| 5,774,668 A | 6/1998 | Choquier | 6,025,868 A | 2/2000 | Russo |
| 5,774,672 A | 6/1998 | Funahashi | 6,034,925 A | 3/2000 | Wehmeyer |
| 5,781,889 A | 7/1998 | Martin et al. | 6,038,591 A | 3/2000 | Wolfe et al. |
| 5,786,784 A | 7/1998 | Gaudichon | 6,040,829 A | 3/2000 | Croy et al. |
| 5,790,172 A | 8/1998 | Imanaka | 6,041,354 A | 3/2000 | Biliris et al. |
| 5,790,671 A | 8/1998 | Cooper | 6,054,987 A | 4/2000 | Richardson |
| 5,790,856 A | 8/1998 | Lillich | 6,055,573 A | 4/2000 | Gardenswartz et al. |
| 5,793,364 A | 8/1998 | Bolanos et al. | 6,057,874 A | 5/2000 | Michaud |
| 5,793,980 A | 8/1998 | Glaser | 6,069,672 A | 5/2000 | Claassen |
| 5,798,785 A | 8/1998 | Hendricks | 6,072,982 A | 6/2000 | Haddad |
| 5,802,283 A | 9/1998 | Grady et al. | 6,107,937 A | 8/2000 | Hamada |

| | | | | | | |
|---|---|---|---|---|---|---|
| 6,118,450 | A | 9/2000 | Proehl et al. | 6,571,282 B1 | 5/2003 | Bowman-Amuah |
| 6,124,804 | A | 9/2000 | Kitao et al. | 6,577,735 B1 | 6/2003 | Bharat |
| 6,131,088 | A | 10/2000 | Hill | 6,578,051 B1 | 6/2003 | Mastronardi et al. |
| 6,131,121 | A | 10/2000 | Mattaway et al. | 6,587,403 B1 | 7/2003 | Keller et al. |
| 6,134,547 | A | 10/2000 | Huxley et al. | 6,590,838 B1 | 7/2003 | Gerlings et al. |
| 6,138,150 | A | 10/2000 | Nichols et al. | 6,598,230 B1 | 7/2003 | Ballhorn |
| 6,148,142 | A | 11/2000 | Anderson | 6,622,307 B1 | 9/2003 | Ho |
| 6,151,077 | A | 11/2000 | Vogel et al. | 6,628,939 B2 | 9/2003 | Paulsen |
| 6,151,634 | A | 11/2000 | Glaser | 6,629,318 B1 | 9/2003 | Radha et al. |
| 6,154,207 | A * | 11/2000 | Farris et al. ............... 715/500.1 | 6,643,620 B1 | 11/2003 | Contolini et al. |
| 6,157,935 | A | 12/2000 | Tran et al. | 6,643,690 B1 | 11/2003 | Duursma et al. |
| 6,161,059 | A | 12/2000 | Tedesco et al. | 6,654,801 B2 | 11/2003 | Mann et al. |
| 6,170,060 | B1 | 1/2001 | Mott et al. | 6,658,090 B1 | 12/2003 | Harjunen et al. |
| 6,173,172 | B1 | 1/2001 | Masuda et al. | 6,662,231 B1 | 12/2003 | Drosset et al. |
| 6,175,861 | B1 | 1/2001 | Williams, Jr. et al. | 6,702,585 B2 | 3/2004 | Okamoto |
| 6,182,126 | B1 | 1/2001 | Nathan et al. | 6,728,956 B2 | 4/2004 | Ono |
| 6,185,184 | B1 | 2/2001 | Mattaway et al. | 6,728,966 B1 | 4/2004 | Arsenault et al. |
| 6,185,619 | B1 | 2/2001 | Joffe et al. | 6,744,882 B1 | 6/2004 | Gupta et al. |
| 6,191,780 | B1 | 2/2001 | Martin et al. | 6,751,794 B1 | 6/2004 | McCaleb et al. |
| 6,192,340 | B1 | 2/2001 | Abecassis | 6,755,744 B1 | 6/2004 | Nathan et al. |
| 6,198,408 | B1 | 3/2001 | Cohen | 6,789,215 B1 | 9/2004 | Rupp et al. |
| 6,202,060 | B1 | 3/2001 | Tran | 6,816,578 B1 | 11/2004 | Kredo et al. |
| 6,209,060 | B1 | 3/2001 | Machida | 6,898,161 B1 | 5/2005 | Nathan |
| 6,212,138 | B1 | 4/2001 | Kalis et al. | 6,904,592 B1 | 6/2005 | Johnson |
| 6,216,227 | B1 | 4/2001 | Goldstein et al. | 6,928,653 B1 | 8/2005 | Ellis et al. |
| 6,219,692 | B1 | 4/2001 | Stiles | 6,942,574 B1 | 9/2005 | LeMay et al. |
| 6,223,209 | B1 | 4/2001 | Watson | 6,974,076 B1 | 12/2005 | Siegel |
| 6,240,550 | B1 | 5/2001 | Nathan et al. | 7,024,485 B2 | 4/2006 | Dunning et al. |
| 6,243,725 | B1 | 6/2001 | Hempleman et al. | 7,107,109 B1 | 9/2006 | Nathan et al. |
| 6,247,022 | B1 | 6/2001 | Yankowski | 7,124,194 B2 | 10/2006 | Nathan et al. |
| 6,256,773 | B1 | 7/2001 | Bowman-Amuah | 7,188,352 B2 | 3/2007 | Nathan et al. |
| 6,262,569 | B1 * | 7/2001 | Carr et al. ............... 324/74 | 7,195,157 B2 | 3/2007 | Swartz et al. |
| 6,280,327 | B1 | 8/2001 | Leifer et al. | 7,198,571 B2 | 4/2007 | LeMay et al. |
| 6,288,991 | B1 | 9/2001 | Kajiyama et al. | 7,206,417 B2 | 4/2007 | Nathan |
| 6,289,382 | B1 | 9/2001 | Bowman-Amuah | 7,210,141 B1 | 4/2007 | Nathan et al. |
| 6,292,443 | B1 | 9/2001 | Awazu et al. | 7,231,656 B1 | 6/2007 | Nathan |
| 6,298,373 | B1 | 10/2001 | Burns et al. | 7,237,198 B1 | 6/2007 | Chaney |
| 6,302,793 | B1 | 10/2001 | Fertitta et al. | 7,293,277 B1 | 11/2007 | Nathan |
| 6,308,204 | B1 | 10/2001 | Nathan et al. | 7,356,831 B2 | 4/2008 | Nathan |
| 6,311,214 | B1 | 10/2001 | Rhoads | 7,406,529 B2 | 7/2008 | Reed |
| 6,315,572 | B1 | 11/2001 | Owens et al. | 7,424,731 B1 | 9/2008 | Nathan et al. |
| 6,323,911 | B1 | 11/2001 | Schein et al. | 7,448,057 B1 | 11/2008 | Nathan |
| 6,332,025 | B2 | 12/2001 | Takahashi et al. | 7,483,958 B1 | 1/2009 | Elabbady et al. |
| 6,336,219 | B1 | 1/2002 | Nathan | 7,500,192 B1 | 3/2009 | Mastronardi |
| 6,341,166 | B1 | 1/2002 | Basel | 7,512,632 B2 | 3/2009 | Mastronardi et al. |
| 6,344,862 | B1 | 2/2002 | Williams et al. | 7,519,442 B2 | 4/2009 | Nathan et al. |
| 6,346,951 | B1 | 2/2002 | Mastronardi | 7,549,919 B1 | 6/2009 | Nathan et al. |
| 6,356,971 | B1 | 3/2002 | Katz et al. | 7,574,727 B2 | 8/2009 | Nathan et al. |
| 6,359,661 | B1 | 3/2002 | Nickum | 7,647,613 B2 | 1/2010 | Drakoulis et al. |
| 6,370,580 | B2 | 4/2002 | Kriegsman | 7,749,083 B2 | 7/2010 | Nathan et al. |
| 6,381,575 | B1 | 4/2002 | Martin et al. | 7,757,264 B2 | 7/2010 | Nathan |
| 6,384,737 | B1 | 5/2002 | Hsu et al. | 7,783,774 B2 | 8/2010 | Nathan et al. |
| 6,393,584 | B1 | 5/2002 | McLaren et al. | 7,793,331 B2 | 9/2010 | Nathan et al. |
| 6,396,480 | B1 | 5/2002 | Schindler et al. | 2001/0016815 A1 | 8/2001 | Takahashi et al. |
| 6,397,189 | B1 | 5/2002 | Martin et al. | 2001/0023403 A1 | 9/2001 | Martin et al. |
| 6,407,987 | B1 | 6/2002 | Abraham | 2001/0030660 A1 | 10/2001 | Zainoulline |
| 6,408,435 | B1 | 6/2002 | Sato | 2001/0037367 A1 | 11/2001 | Iyer |
| 6,408,437 | B1 | 6/2002 | Hendricks et al. | 2001/0044725 A1 | 11/2001 | Matsuda et al. |
| 6,421,651 | B1 | 7/2002 | Tedesco et al. | 2002/0002079 A1 | 1/2002 | Martin et al. |
| 6,425,125 | B1 | 7/2002 | Fries et al. | 2002/0002483 A1 | 1/2002 | Siegel et al. |
| 6,430,537 | B1 | 8/2002 | Tedesco et al. | 2002/0113824 A1 | 8/2002 | Myers |
| 6,430,738 | B1 | 8/2002 | Gross et al. | 2002/0116476 A1 | 8/2002 | Eyal et al. |
| 6,434,678 | B1 | 8/2002 | Menzel | 2002/0118949 A1 | 8/2002 | Jones et al. |
| 6,438,450 | B1 | 8/2002 | DiLorenzo | 2002/0120925 A1 | 8/2002 | Logan |
| 6,442,549 | B1 | 8/2002 | Schneider | 2002/0129036 A1 | 9/2002 | Ho Yuen Lok et al. |
| 6,446,130 | B1 | 9/2002 | Grapes | 2002/0162104 A1 | 10/2002 | Raike et al. |
| 6,449,688 | B1 | 9/2002 | Peters et al. | 2003/0005099 A1 | 1/2003 | Sven et al. |
| 6,470,496 | B1 | 10/2002 | Kato et al. | 2003/0008703 A1 | 1/2003 | Gauselmann |
| 6,488,508 | B2 | 12/2002 | Okamoto | 2003/0018740 A1 | 1/2003 | Sonoda et al. |
| 6,490,570 | B1 | 12/2002 | Numaoka | 2003/0031096 A1 | 2/2003 | Nathan et al. |
| 6,496,927 | B1 | 12/2002 | McGrane et al. | 2003/0041093 A1 | 2/2003 | Yamane et al. |
| 6,498,855 | B1 | 12/2002 | Kokkosoulis et al. | 2003/0065639 A1 | 4/2003 | Fiennes et al. |
| 6,522,707 | B1 | 2/2003 | Brandstetter et al. | 2003/0088538 A1 | 5/2003 | Ballard |
| 6,535,911 | B1 | 3/2003 | Miller et al. | 2003/0093790 A1 | 5/2003 | Logan et al. |
| 6,538,558 | B2 | 3/2003 | Sakazume et al. | 2003/0101450 A1 | 5/2003 | Davidsson et al. |
| 6,543,052 | B1 | 4/2003 | Ogasawara | 2003/0104865 A1 | 6/2003 | Itkis et al. |
| 6,544,122 | B2 | 4/2003 | Araki et al. | 2003/0108164 A1 | 6/2003 | Laurin et al. |
| 6,549,719 | B2 | 4/2003 | Mankovitz | 2003/0135424 A1 | 7/2003 | Davis et al. |
| 6,570,507 | B1 | 5/2003 | Lee et al. | 2003/0208586 A1 | 11/2003 | Mastronardi et al. |

| | | |
|---|---|---|
| 2003/0225834 A1 | 12/2003 | Lee et al. |
| 2004/0025185 A1 | 2/2004 | Goci et al. |
| 2004/0085334 A1 | 5/2004 | Reaney |
| 2004/0103150 A1 | 5/2004 | Ogdon et al. |
| 2004/0204220 A1 | 10/2004 | Fried et al. |
| 2004/0220926 A1 | 11/2004 | Lamkin et al. |
| 2005/0060405 A1 | 3/2005 | Nathan et al. |
| 2005/0073782 A1 | 4/2005 | Nathan |
| 2005/0086172 A1 | 4/2005 | Stefik |
| 2005/0125833 A1 | 6/2005 | Nathan et al. |
| 2005/0267819 A1 | 12/2005 | Kaplan |
| 2006/0018208 A1 | 1/2006 | Nathan et al. |
| 2006/0035707 A1 | 2/2006 | Nguyen et al. |
| 2006/0062094 A1 | 3/2006 | Nathan et al. |
| 2006/0239131 A1 | 10/2006 | Nathan et al. |
| 2006/0293773 A1 | 12/2006 | Nathan et al. |
| 2007/0121430 A1 | 5/2007 | Nathan |
| 2007/0142022 A1 | 6/2007 | Madonna et al. |
| 2007/0160224 A1 | 7/2007 | Nathan |
| 2007/0204263 A1 | 8/2007 | Nathan et al. |
| 2007/0209053 A1 | 9/2007 | Nathan |
| 2007/0247979 A1 | 10/2007 | Brillon et al. |
| 2008/0069545 A1 | 3/2008 | Nathan et al. |
| 2008/0077962 A1 | 3/2008 | Nathan |
| 2008/0086379 A1 | 4/2008 | Dion et al. |
| 2008/0096659 A1 | 4/2008 | Kreloff et al. |
| 2008/0137849 A1 | 6/2008 | Nathan |
| 2008/0168807 A1 | 7/2008 | Dion et al. |
| 2008/0171594 A1 | 7/2008 | Fedesna et al. |
| 2008/0195443 A1 | 8/2008 | Nathan et al. |
| 2008/0239887 A1 | 10/2008 | Tooker et al. |
| 2009/0037969 A1 | 2/2009 | Nathan et al. |
| 2009/0070341 A1 | 3/2009 | Mastronardi et al. |
| 2009/0138111 A1 | 5/2009 | Mastronardi |
| 2009/0265734 A1 | 10/2009 | Dion et al. |
| 2009/0282491 A1 | 11/2009 | Nathan |
| 2010/0042505 A1 | 2/2010 | Straus |
| 2010/0211818 A1 | 8/2010 | Nathan et al. |

FOREIGN PATENT DOCUMENTS

| | | |
|---|---|---|
| DE | 3815071 | 11/1989 |
| DE | 4 244 198 | 6/1994 |
| DE | 19904007 | 8/2000 |
| EP | 0082077 | 6/1983 |
| EP | 0140593 A2 | 5/1985 |
| EP | 0256921 | 2/1988 |
| EP | 0283304 | 9/1988 |
| EP | 0283350 | 9/1988 |
| EP | 0 309 298 | 3/1989 |
| EP | 0313359 | 4/1989 |
| EP | 0340787 | 11/1989 |
| EP | 0363186 | 4/1990 |
| EP | 0 425 168 A | 5/1991 |
| EP | 0425168 | 5/1991 |
| EP | 0464562 A2 | 1/1992 |
| EP | 0480558 | 4/1992 |
| EP | 0498130 | 8/1992 |
| EP | 0498130 A2 | 8/1992 |
| EP | 0 507 110 | 10/1992 |
| EP | 0529834 | 3/1993 |
| EP | 0538319 B1 | 4/1993 |
| EP | 0631283 | 12/1994 |
| EP | 0632371 | 1/1995 |
| EP | 0711076 | 5/1996 |
| EP | 0786122 B1 | 7/1997 |
| EP | 0817103 | 1/1998 |
| EP | 0841616 A2 | 5/1998 |
| EP | 0919964 | 6/1999 |
| EP | 0959570 A1 | 11/1999 |
| EP | 0 974896 A1 | 1/2000 |
| EP | 0974941 | 1/2000 |
| EP | 0982695 | 3/2000 |
| EP | 1001391 | 5/2000 |
| EP | 1408427 | 4/2004 |
| FR | 2602352 | 2/1988 |
| FR | 2808906 | 11/2001 |
| GB | 2122799 | 1/1984 |
| GB | 2166328 A | 4/1986 |
| GB | 2170943 | 8/1986 |
| GB | 2193420 | 2/1988 |
| GB | 2 238680 A | 6/1991 |
| GB | 2254469 | 10/1992 |
| GB | 2259398 | 3/1993 |
| GB | 2259398 A * | 3/1993 |
| GB | 2262170 A | 6/1993 |
| GB | 2380377 | 4/2003 |
| JP | 57-173207 | 10/1982 |
| JP | 61084143 | 4/1986 |
| JP | 5122282 | 5/1993 |
| JP | 07281682 | 10/1995 |
| JP | 08-279235 | 10/1996 |
| JP | 8274812 | 10/1996 |
| JP | 10-098344 | 4/1998 |
| WO | WO 86 01326 A | 2/1986 |
| WO | WO 90/07843 | 7/1990 |
| WO | WO 91/08542 | 6/1991 |
| WO | WO 91/20082 | 12/1991 |
| WO | WO 93/16557 | 8/1993 |
| WO | WO 93/18465 | 9/1993 |
| WO | WO 94/03894 | 2/1994 |
| WO | WO 94/14273 | 6/1994 |
| WO | WO 94/15306 | 7/1994 |
| WO | WO 94 15416 A | 7/1994 |
| WO | WO 95 03609 A | 2/1995 |
| WO | WO 95/29537 | 11/1995 |
| WO | WO 96/12255 | 4/1996 |
| WO | WO 96/12256 | 4/1996 |
| WO | WO 96/12257 | 4/1996 |
| WO | WO 96 12258 A | 4/1996 |
| WO | WO 98/07940 | 2/1998 |
| WO | WO 98/45835 | 10/1998 |
| WO | WO 01/00290 | 1/2001 |
| WO | WO 01/08148 | 2/2001 |
| WO | WO 02/095752 | 11/2002 |
| WO | WO 20061014739 | 2/2006 |

OTHER PUBLICATIONS

"Ecast Forges Landmark International Technology Partnership", Business Wire at www.findarticles.com/cf_0/m0EIN/2000_July_25/63663604/print.jhtml, 2 pages, Jul. 25, 2000.

"Ecast Selects Viant to Build Siren Entertainment System (TM)", ScreamingMedia, PR Newswire San Francisco, industry.java.sum.com/javanews/stories/story2/0,1072,17618,00.html, 3 pages, Aug. 3, 1999.

Bonczek et al, "The DSS Development System", 1983 National Computer Conference, Anaheim, California, May 16-19, 1983, pp. 441-455.

Derfler et al., "How Networks Work", Millennium Ed., Que Corporation, Jan. 2000.

European Search Report from EP 1 993 079.

European Search Report issued for European Application No. 08000845.1-1238/1962251, dated Apr. 3, 2009.

Gralla, "How the Internet Works", Millennium Ed., Que Corporation, Aug. 1999.

Grimes, Chapter 18, "Taking Advantage of Web-based Audio".

Hicks et al., "Dynamic software updating", ACM PLDI, pp. 13-23, 2001.

IBM Technical Disclosure Bulletin, vol. 30, No. 5, Oct. 1987, "Method for Automated Assembly of Software Versions", pp. 353-355.

IBM Technical Disclosure Bulletin, vol. 32, No. 9A, Feb. 1990, "Robotic Wafer Handling System for Class 10 Environments" pp. 141-143.

IBM Technical Disclosure Bulletin, vol. 33, No. 12, May 1991, "High-speed Opens and Shorts Substrate Tester", pp. 251-259.

iTOUCH 27 New Games brochure, JVL Corporation, 2005, 2 pages.

iTouch 8 Plus brochure, JVL Corporation, 2005, 2 pages.

Koskelainem, "Report on Streamworks™".

Kozierok, The PC Guide, Site Version 2.2.0, http://www.pcguide.com, Apr. 17, 2001.

Liang et al., "Dynamic class loading in the Java virtual machine", ACM OOPSLA, pp. 36-44, 1998.

Look and iTouch brochure, JVL Corporation, 2004, 2 pages.

Megatouch Champ brochure, Merit Industries, Inc., 2005, 2 pages.

Melnik et al., "A mediation infrastructure for digital library services", ACM DL, pp. 123-132, 2000.

Mod Box Internet brochure, Merit Entertainment, 2006, 2 pages.

Newsome et al., "Proxy compilation of dynamically loaded java classes with MoJo", ACM LCTES, pp. 204-212, 2002.

Patent Abstract of Japan vol. 95, No. 010 & JP 07 281682 A (Naguo Yuasa), Oct. 27 1 JP 07 281682, figure 1-6 abrége.

Schneier, "Applied Cryptography", Second Edition, John Wiley & Sons, Inc. New York, 1996.

Stevens, "TCP/IP Illustrated: vol. 1, the Protocols".

Vortex Brochure, JVL Corporation, 2005, 2 pages.

Waingrow, "Unix Hints & Hacks", Que Corporation, Indianapolis, IN, 1999.

White, "How Computers Work", Millennium Ed., Que Corporation, Indianapolis, IN, Sep. 1999 (Sep. 22, 1999).

* cited by examiner

PAY-PER-PLAY AUDIOVISUAL SYSTEM WITH TOUCH SCREEN INTERFACE

This is a continuation of application Ser. No. 08/817,968, filed Oct. 2, 1997, now abandoned, which was the U.S. national phase of the PCT application PCT/FR95/01335, filed on Oct. 12, 1995, which claimed priority to PCT/FR94/01185, filed on Oct. 12, 1994, the entire contents of which are hereby incorporated by reference in this application.

The invention relates to a payment-triggered audiovisual reproduction system.

These audiovisual reproduction systems are generally found in cafes or pubs. This type of system is composed of a sound reproduction machine usually called a jukebox linked to a monitor which displays video images or video clips. To do this the jukebox is equipped with a compact video disk player and a compact video disk library and includes selection buttons which locate the titles of pieces of music which are available. Payment of a proper fee followed by one or more selections authorizes activation of the system with automatic loading in the player of the disk on which the selected piece is found, the desired audiovisual reproduction then being able to start.

These systems, although allowing faithful and good quality reproduction, nevertheless have major defects. Thus, a first defect relates to the space necessary for storing the library; this consequently entails the system having large dimensions and will be bulky. Likewise these systems which call on mostly mechanical material using sophisticated techniques have high fault rates; this is another defect. Finally it is very unusual for all the pieces on a disk to be regularly heard; some are almost never played but still cannot be eliminated. Besides this defect, the following problem is caused by the companies, which manage and distribute these systems, placing into circulation a limited number of identical disks and imposing a certain rotation on their customers; this sometimes entails an unpleasant wait for the customers when a disk is not available.

In addition, patent application PCT/WO 93 18465 discloses computerized jukeboxes which allow reception via a telecommunications network and a modem connecting the jukeboxes to the network digital data comprising downloaded songs or musical pieces in a mass storage of the jukeboxes. The communications system is likewise used for downloading of representative files of digitized graphics information, the songs and graphics files being compressed before they are sent over the network. The jukebox processor then uses these files by decompressing them and sending the graphics data to the video circuit and the song data to the audio circuit.

However, the processor also manages the man/machine interfaces and management of these different elements is done by sequentially displaying the graphics images representative of the song, then by responding to the touch action of the user, then checking that the user has paid the prescribed amounts, and finally when the required amount has been accounted, placing the selection in a queue for its subsequent execution. Otherwise this system can only operate by first displaying the graphics images and then starting performance of the song because the processor cannot, according to the flowcharts, execute two tasks at one time. Finally, the graphics representations are uniquely data of the album cover of the song digitized by a scanner table. In no case does this jukebox allow display of moving images during the broadcast of the song or music. Likewise, since the processor is used for digital data decompression and processing for conversion into audio signals, it cannot consider the new actions of a user making a new selection. This is apparent, notably on page 12 of the PCT application, lines 25 to 27. Selection of new songs can only be done when the jukebox is in the attraction mode, i.e., in the one in which it displays graphics representations of different songs stored in the jukebox in succession.

U.S. Pat. No. 4,956,768 discloses a broadband server for transmitting music or images formed by a main processor communicating by a DMA channel with a hard disk and output cards each controlled by a supplementary local processor which manages an alternative mode of access to two buffer memories A and B, of which one, A, is used to deliver for example musical data to a user, while the other is filled. Each of the output cards is connected to a consultation station which can be local and situated in the same vicinity as the server or at a distance and connected by an audio or video communications network. The server receives data block-by-block and ensures that the same parities are corrected and rejects a block including more than two successive wrong samples. Each of these blocks is of course designated by a number. Once a block has been accepted, it can be stored on the local hard disk by recording its original number which has no relation to its physical address on the hard disk. The consultation stations have audio and video outputs such as loudspeakers or headphones a television monitor which makes it possible to listen to music or display images in response. to requests received from terminals included in the consultation stations. In this system the consultation stations or the first communications processor must have specific software for management of selection requests for musical pieces or video. It is only when the request has been made and addressed to the broadband server processor that it can transfer, under the authority of the local processor, the data in the buffer memories such that this local processor ensures that the data are sent to the consultation stations. Moreover, it is added that the output cards and buffer memories are filled only after having received the authorization of the local processor of the card.

Consequently, this system can only function within the framework of a multiprocessor device and does not in any way suggest use of this server for a jukebox controlled by a single processor operating in a multitask environment. This system proposed by the U.S. patent thus implements a complex facility which allows delivery of a service to several consultation stations; this complex facility is thus costly and incompatible with a system of jukeboxes, of which the cost price should be as low as possible.

Finally, jukeboxes of the prior art include numerous mechanical and electromechanical pieces for forming the man/machine interface which increase the possibilities of system failure and do not impart a high level of ergonomics to the device.

SUMMARY OF THE INVENTION

The object of the invention is to eliminate the various aforementioned defects of the systems of the prior art and it devises an intelligent digital audiovisual system which allows better ergonomics while reducing the risk of failure by reducing the number of mechanical parts.

This object is achieved by the payment-based audiovisual reproduction system, developed around a microprocessor device linked to a payment device, on the one hand comprising fundamentally mass storage means, for among others storage, in compressed digital form, of the audio and visual information to be used, and on the other hand linked, via interfaces, to digital display means and digital audio reproduction means allowing formation of a multimedia environment, being characterized in that the digital display means and the video monitor are linked to a touch screen linked to an interface program which reacts to external events and translates them for the graphics operating system as mouse events which trigger via a library of integrated tools and services either modification of the progression of one of the program modules of the man/machine interface or modification of the physical operating parameters of the jukebox.

According to another feature the library of tools and services includes a plurality of graphics display modules which comprise using the touch screen interface a plurality of control panels among which a first title selection panel proceeding to assist in search and selection of a desired title, a second control panel for managing the physical parameters of the jukebox, a third panel for scanning the title database, for private use, to allow exploration of the database containing the available titles and control of a selection of these titles via the audiovisual data distribution network to control and retrieve said titles, a fourth statistics panel, for private use, for statistical estimations and calculations relative to the titles.

According to another feature a management mode module allows recording of the operating parameters of the system in a file stored in the hard disk in a machine format which cannot be read by the user, the data backed up on the disk being reread each time the system is activated.

According to another feature, the system operating parameters file makes it possible to fix the price of a title or number of titles for a predetermined value, the inactivity delay before starting the visual promotional mode, the inactivity delay before starting an auxiliary source such as a radio for example, the inactivity delay before starting the selection sampling mode, the location determined in seconds from the beginning where the system will be able to start sampling a selection, and the duration in seconds of the sample.

According to another feature, a system control module (CM) includes a graphics display module in which a set of cursors is represented in a window, each of the cursors being linked to one of the parameters of a controlled physical function, the touch screen interface module linked to this graphics module interpreting the coincidence of the placement of the finger on the touch screen with the position of cursor display as a mouse down, movement of the finger on the touch screen as mouse drag and lifting of the finger from the touch screen as an up for the operating software, the last position of the cursor moved during the drag event being stored by the system and used by it to control the corresponding physical parameter.

According to another feature, a first cursor is linked to the master volume level;
  a second cursor is linked to the jukebox volume level;
  a third cursor is linked to the microphone volume level;
  a fourth cursor is linked to the volume level of an auxiliary input (tuner function, radio);
  a fifth cursor is linked to the base control level;
  a sixth cursor is linked to the treble control level;
  a seventh cursor is linked to balance control.

According to another feature, the tool library includes a first database of titles available on the jukebox and a second database of titles available for purchase by the jukebox manager, the database being selected when the external events recorded by the interface module linked to the graphics module used coincide.

According to another feature a customer browsing and selection mode graphics module allows selection among available titles on the database those corresponding to a specific type of music by display of a window comprising a plurality of buttons.

According to another feature, the ensemble is managed by a multitask operating system with a kernel which links to each of the peripheral means a task and assigning the highest priority to the display task and level two priority to the audio task, at least one temporary storage buffer (66, 67 or 56, 57) of the data to be decompressed being linked to respective display (6) and audio reproduction (5) means to allow processing of the data transferred to one of the means during processing of a transfer to another means by the operating system and a scheduling module of the operating system linking a status buffer positioned at a value indicative of the task activity when one of the temporary buffers contains data.

According to another feature, the system is linked via interface (158) to telecommunications modem (4, 41), said system then being connected to an audiovisual data distribution system by the telecommunications modem and telecommunications lines, this telecommunications function likewise being managed by the multitask operating system included in the library of tools and services integrated in the storage means with third level priority and linking to this telecommunications task temporary buffer (26) for storage of data to be transferred and buffer (841) for indicating the status of this task.

According to another feature the operating system includes priority resolution module (11) which, depending on the priorities assigned to the declared active tasks, will acknowledge reception of the request for a task or will respond with a busy signal, and a scheduling module (12) which depending on the declared active tasks and the availability of sufficient hardware resources fills a storage request queue.

According to another feature temporary buffer (36) for storage of data from a man/machine interface and buffer (831) which indicates the status of this task of the man/machine interface are linked to interface task (73) such as selection of zones on a touch screen, each zone corresponding to a choice among the data displayed on the display means.

BRIEF DESCRIPTION OF THE DRAWINGS

Other advantages and features of the invention follow from the following description, with reference to the attached drawings, given by way of example but not limited to one embodiment of the invention, in which.

DETAILED DESCRIPTION OF THE PREFERRED EMBODIMENTS

Figure 1:
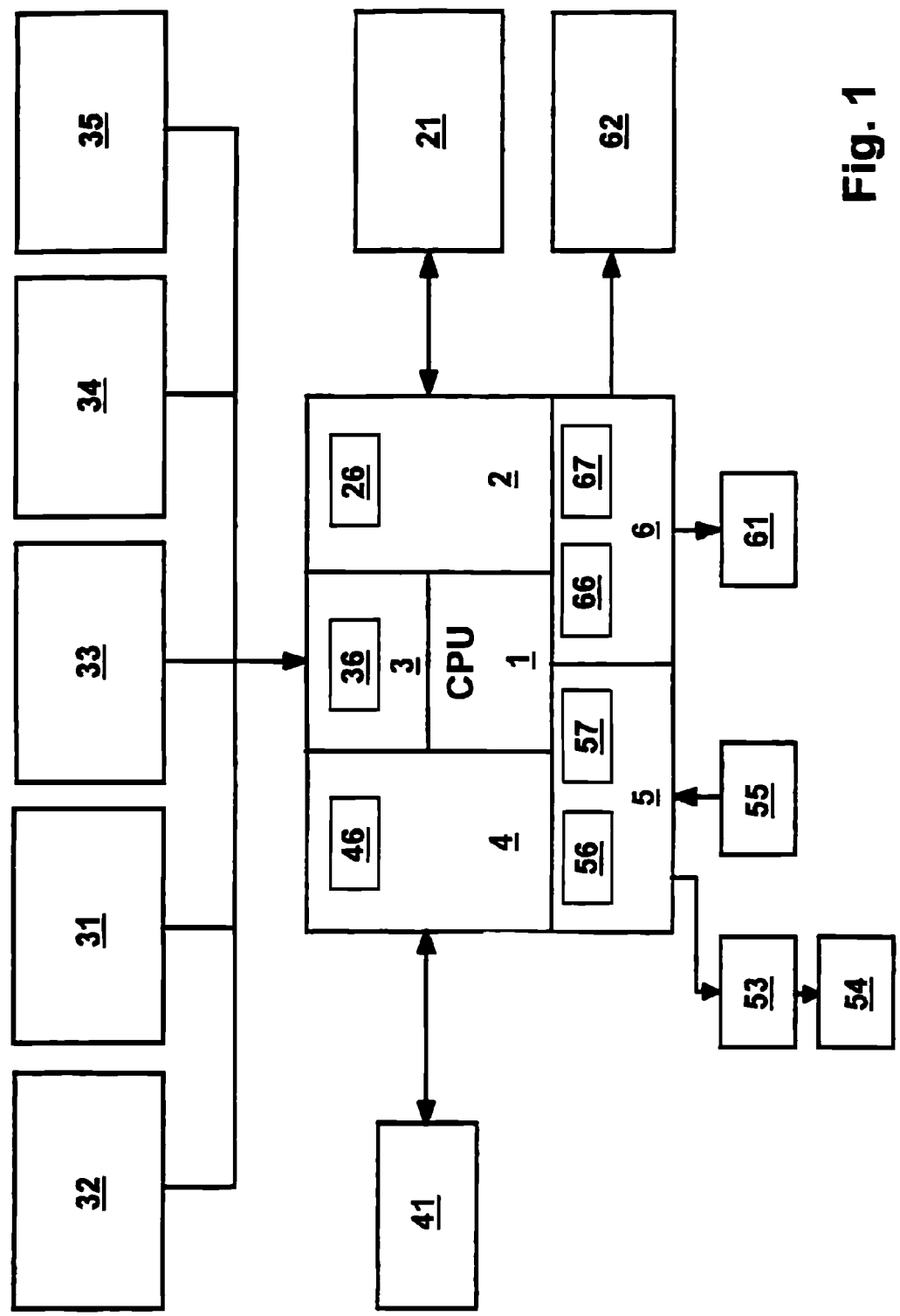
FIG. 1 shows a circuit diagram of the hardware comprising the invention.

Preferably, but in a nonrestrictive manner, the audiovisual reproduction system uses the aforementioned listed components.

Microprocessor central unit 1 is a high performance PC-compatible system, the choice for the embodiment having fallen on an Intel 80486 DX/2 system which has storage means and the following characteristics.
 compatibility with the local Vesa bus,
 processor cache memory: 256 kO,
 RAM of 32 MO or more with battery back-up
 high performance parallel and serial ports,
 SVGA microprocessor graphics adapter,
 type SCSI/2 bus type controller.

Any other central unit with equivalent or superior performance can be used in the invention.

This central unit controls and manages audio control circuit (5), telecommunications control circuit (4), input control circuit (3), mass storage control circuit (2), and display means control circuit (6). The display means consist essentially of 14 inch (35.56 cm) flat screen video monitor (62) without interleaving of the SVGA type, with high resolution and low radiation. It is this monitor which is used for video reproduction (for example, the covers of the albums of the musical selections), graphics or video clips.

Mass storage means (21) using high speed and high capacity SCSI type hard disks are connected to the storage means already present in the microprocessor device. These modules allow storage of digitized and compressed audiovisual data.

High speed 28.8 kbps telecommunications modem (41) or any other telecommunications hardware linked to other telecommunications media is integrated to authorize connection to the audiovisual data distribution network controlled by a central server.

To reproduce the audio data of the musical selections, the system includes loudspeakers (54) which receive the signal from amplifier-tuner (53) connected to electronic circuit (5) of the music synthesizer type provided to support a large number of input sources while providing an output with CD (compact disk) type quality, such as for example a microprocessor multimedia audio adapter of the "Sound Blaster" card type SBP32AWE from Creative Labs Inc. on which two buffers (56, 57) are added for a purpose to be explained below.

Likewise the control circuit of the display means includes two buffer memories (66, 67) for a purpose to be explained below.

A thermally controlled 240 watt ventilated power supply provides power to the system. This power supply is protected against surges and harmonics.

The audiovisual reproduction system manages via its input controller circuit (3) 14 inch (35.56 cm) touch screen "Intelli Touch" (33) from Elo Touch Systems Inc. which includes a glass coated board using "advanced surface wave technology" and an AT type bus controller. This touch screen allows, after having displayed on video monitor (62) or television screen (61) various selection data used by the customers, management command and control information used by the system manager or owner. It is likewise used for maintenance purposes in combination with external keyboard (34) which can be connected to the system which has a keyboard connector for this purpose, controlled by key lock (32) via interface circuit (3).

Input circuit (3) likewise interfaces with the system remote control set (31) composed for example of:
 an infrared remote control from Mind Path Technologies Inc., an emitter which has 15 control keys for the microprocessor system and 8 control keys for the projection device.
 an infrared receiver with serial adapter from Mind Path Technologies Inc.

Fee payment device (35) from National Rejectors Inc. is likewise connected to input interface circuit (3). It is also possible to use any other device which allows receipt of any type of payment by coins, bills, tokens, magnetic chip cards or a combination of means of payment.

To house the system a chassis or frame of steel with external customizable fittings is also provided.

Besides these components, wireless microphone (55) is connected to audio controller (5); this allows conversion of the latter into a powerful public address system or also a karaoke machine. Likewise a wireless loudspeaker system can be used by the system.

Remote control set (31) allows the manager, for example from behind the bar, access to and control of various commands such as:
 microphone start/stop command,
 loudspeaker muting command,
 audio volume control command;
 command to cancel the musical selection being played.

Two buffers (56, 57) are connected to audio controller circuit (5) to allow each to store information corresponding to a quarter of a second of sound in alternation. Likewise two buffers (66, 67) are linked to video controller circuit (6), each able to store a tenth of a second of video alternately. Finally, respective buffer (46, 36, 26) is connected to each of the circuits of communications controller (4), input interface (3) and storage interface (2).

The system operating software has been developed around a library of tools and services largely oriented to the audiovisual domain in a multimedia environment. This library advantageously includes an efficient multitask operating system which efficiently authorizes simultaneous execution of multiple fragments of code. This operating software thus allows concurrent execution, in an orderly manner and avoiding any conflict, of operations performed on the display means, audio reproduction means as well as management of the telecommunications lines via the distribution network. In addition, the software has high flexibility.

This library includes as will be seen below a programming interface for the touch screen (153) linked to each graphics module which will be described below and including, depending on the linked graphics module, functions of reaction to activation by one or more external events. External events originate from the user and are processed by the touch screen interface to be able to be interpreted by the operating system as the equivalent of a mouse event. Thus, touching one zone is recognized by the interface of the touch screen as a down event, movement of the finger on the screen as a drag event, removal of the finger from the screen as a button release (up). Each event interpreted by the linked touch screen interface is then delivered to the pertinent module to initiate either modification of the program execution by calling up for example another graphics module or modification of the physical parameters of the machine by initiating storage of these parameters and final use by the electronic components linked to this parameter.

The digitized and compressed audiovisual data are stored in storage means (21).

Each selection is available according to two digitized formats: with hi-fi quality or CD quality.

Figure 2:
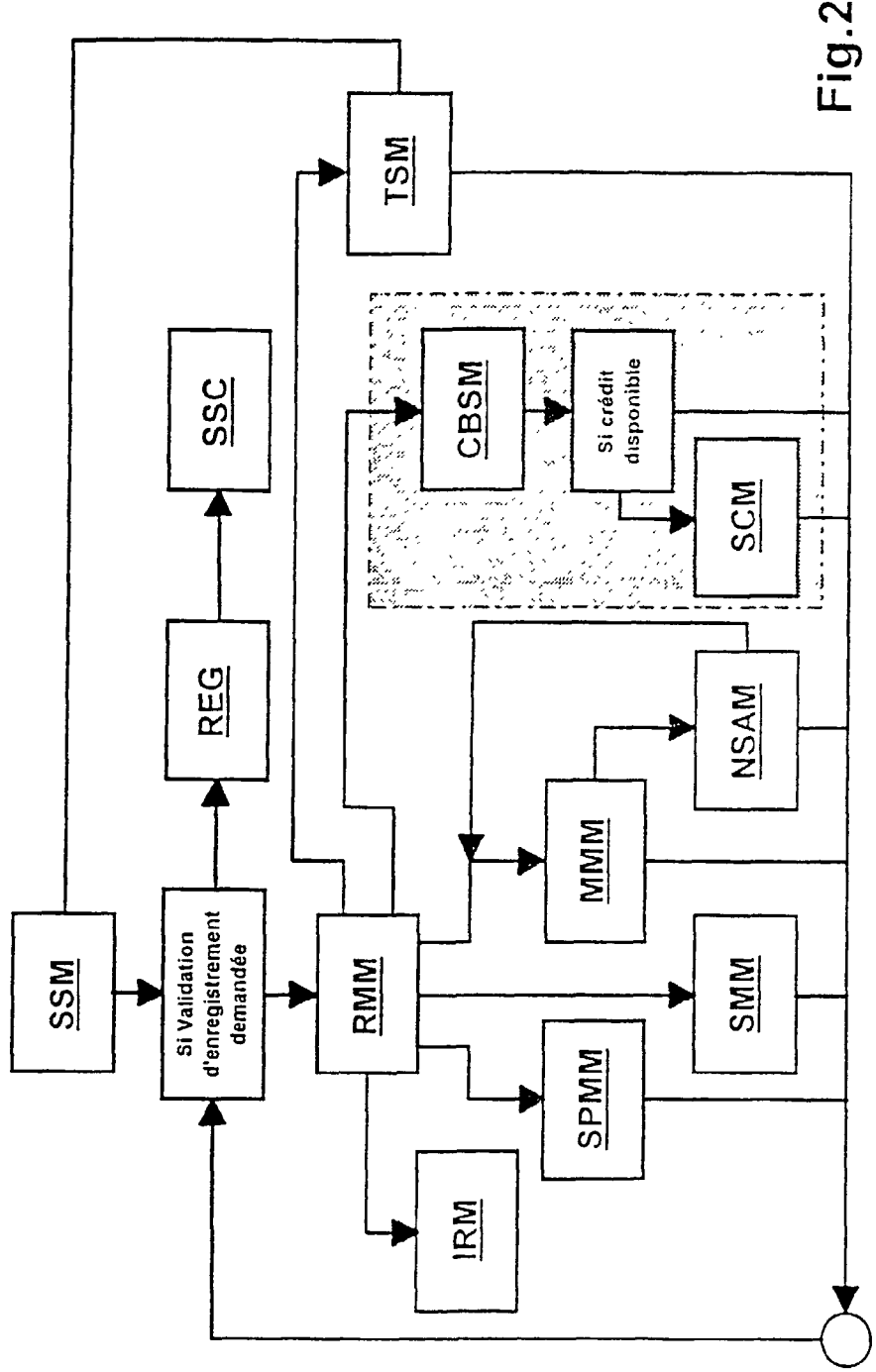
FIG. 2 shows an organizational chart of the service modules specific to a task and managed via a multitask operating system, the set of modules being included in a library stored in the storage means.

Prior to describing and reading this organizational chart in FIG. 2, it must be noted that while all these modules described separately seem to be used sequentially, in reality the specific tasks of these modules are executed simultaneously in an environment using the multitask operating system. Consequently, the organizational chart indicates the specific operations which the module must perform and not a branch toward this module which would invalidate all the operations performed by the other modules.

The first module, labeled SSM, is the system startup module. This module does only one thing, consequently it is loaded automatically when the system is powered up. If the system is started with a correct registration number it then directly enters the "in service" mode of the module labeled RRM.

The REG module is the registration mode module which, when it is activated for the first time or when approval for a new registration is necessary, indicates its software series number and requests that the user enter his coordinates, such as the name of the establishment, address and telephone number.

The RMM module is the module of the "in service" mode which is the mode of operation which the system enters when its registration number has been validated. In this mode the system is ready to handle any request which can be triggered by various predefined events such as:

customers touching the screen: when a customer or user touches the screen, the system transfers control of its foreground session to the customer browsing and selection mode CBSM module, telecommunications network server call requests: when the system detects a loop on the phone line, it broadcasts an asynchronous background procedure: the telecommunications services mode of the TSM module, requests concerning key switch (32): when the manager turns the key switch the system hands over control of its foreground session to the system management SMM (or MMM) module, reception of a remote control signal: when a command is received, it is processed in a background session by the system command SMM module while the foreground session remains available for other interventions, appearance of end of timing, showing inactivity of the system: when one of the various timers is activated, control is temporarily handed over to the inactivity routines IRM module for processing.

The system remains in the "in service" mode until one of the above described events takes place.

Figure 9:
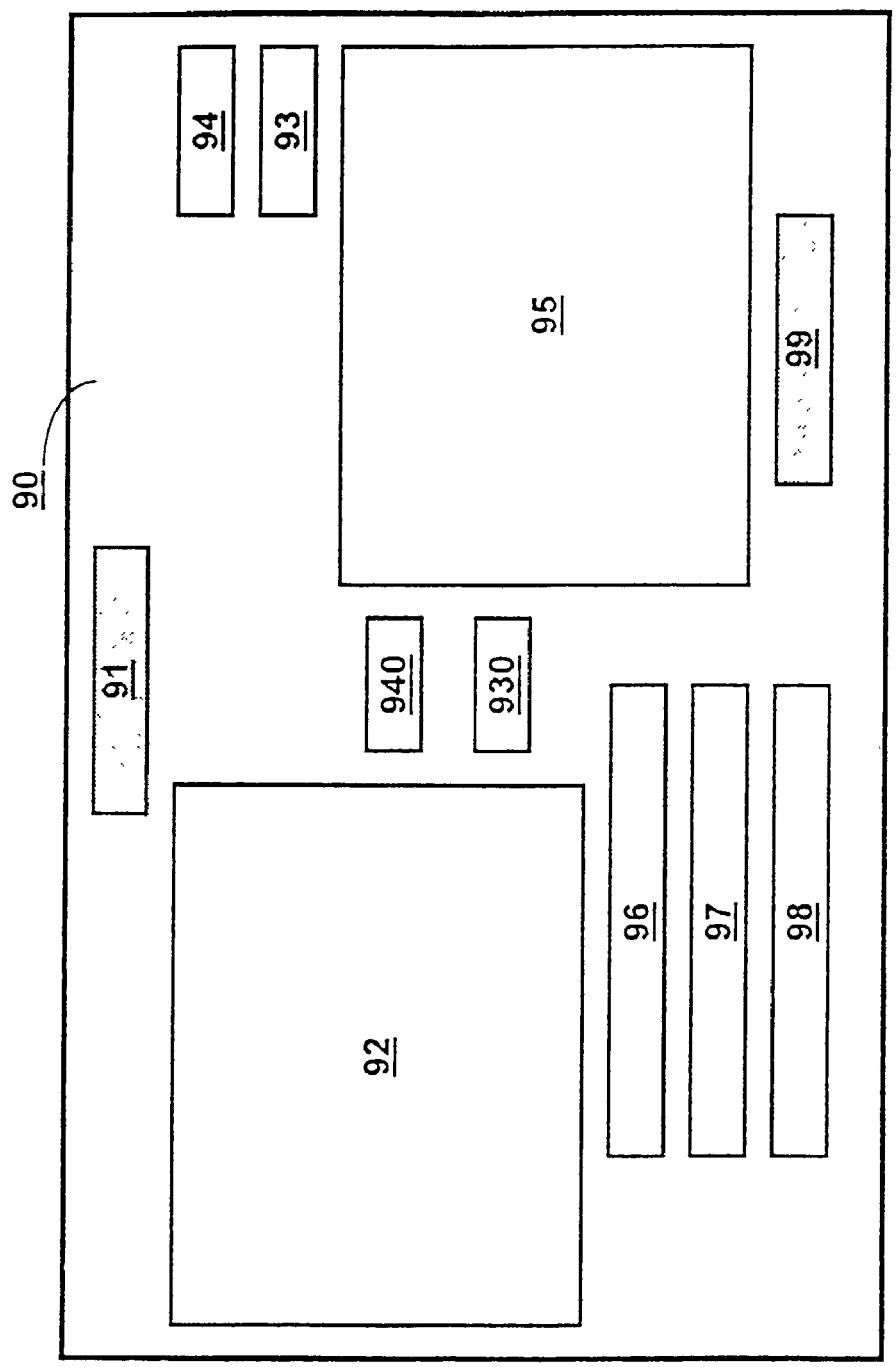
FIG. 9 shows the graphics display by the graphics module of the in service mode module (RMM)

Thus, the RMM module of the in service mode includes a module allowing graphics display corresponding for example to that of FIG. 9. This graphics module allows display of window (90) which contains for example the display in zone (91) of the note "in progress" of execution. Second smaller window (92) included in first window (90) allows graphics display of the disk jacket during performance. In numeric keypad (93) the total time corresponding to pieces to be played which are stored in the queue is indicated. The number of songs in the queue is indicated in another digital keypad (94). Third smaller window (95) included in first window (90) displays a moving image such as a video clip, synthesized images or moving text if it is a "karaoke" title stored in the video files of the hard disk. In alphanumeric keypad (96) is the album title and in second alphanumeric keypad (97) the album name. In third alphanumeric keypad (98) the name of the artist or group is mentioned. Counting down the remaining time of the title is displayed in numeric keypad (940), the duration of the title played is displayed in numeric keypad (930). This information originates from database (16) based on the title identification number and information stored in the database according to the access process corresponding to FIG. 7 explained below. Finally, this window (90) includes zone (99) containing the note "press" or "touch me" encouraging the user to place his finger on the screen for the RMM module, detecting the position of the finger on any zone of the screen via the touch screen interface module, to transfer the control of its session to the CBSM module of the customer selection browsing and selection mode CBSM module.

In the case in which the jukebox is not playing a song and when the songs of the queue have been exhausted, one of two windows (92, 95) will be able to be used to display promotional events or sampling selections entered in the memory by the jukebox manager. These selection samples are designed to encourage the customers to listen to the entire song.

The IRM module is the inactivity routines module. It contains the routines which perform predetermined functions such as album cover display, broadcast of parts of musical pieces present in the system, reproduction of complete selections for internal promotional proposes, audio reproductions for external promotional purposes, promotional spoken announcements of new musical selections, return to an auxiliary source which can be called when the system is inactive and when a predefined but adjustable time interval corresponding to a timer has expired.

The SMM module is the system commands module. This module allows execution of functions which command the system to accept a required input by an infrared remote control device, these functions being handled instantaneously without the process underway being stopped. A very large number of these functions are possible, only some are listed below, in a nonrestrictive manner:

audio volume control of the played selections,
audio volume control of the auxiliary played source,
microphone start/stop command,
microphone audio volume control,
balance control, left channel, right channel,
control of base frequency level,
control of treble frequency level,
command to cancel or skip a musical selection,
command to change the graphics screen preceding and following the one displayed,
triggering of return of the audio input and output settings to the initial state.

Figure 8:
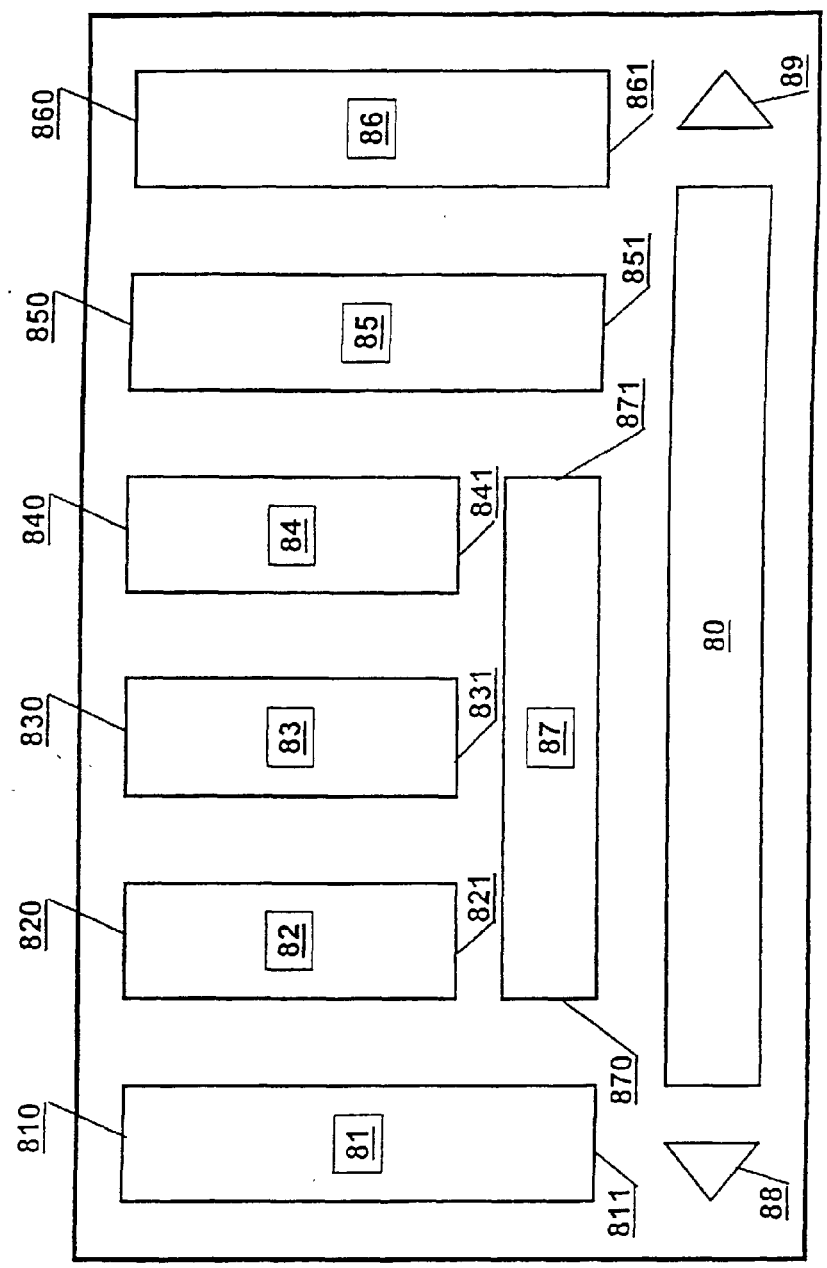
FIG. 8 shows the graphics display by the graphics module of the system management module (CM)

This SMM module, can, during operation of the remote control, cause display on the screen allowing a representation similar to that described in conjunction with FIG. 8 explained below for functions identical to that described in conjunction with FIG. 8.

The MMM module is the management mode module. This module is triggered when the key switch is turned by the manager. The display of an ordinary screen is replaced by a display specific to system management and system operating parameters as shown in FIG. 8. This screen displays in a window by means of a graphics representation module a set of cursors with the position represented between the extreme positions (810, 820, 830, 840, 850, 860, 870) and (811, 821, 831, 841, 851, 861, 871) which represent the maximum course of the cursor, which position corresponds to a visual display of the level of the function of the element of which the value is to be controlled. Thus cursor (81) makes it possible to control the master volume level, cursor (82) controls the jukebox volume level; cursor (83) controls the microphone volume level; cursor (84) controls the volume level of the auxiliary input (radio); cursor (85) controls the base level; cursor (86) controls the treble level; cursor (87) adjusts the balance; arrow (88) allows display of the preceding graphics screen and arrow (89) allows display of the following screen; zone (80) triggers reset of the settings of cursors (81) to (87). This graphics module which allows cursor display on the screen of the monitor or television cooperates with third interface programming module (153) for touch screen (33) while allowing the manager, when he places his finger on one of the cursor representations and then slides his finger to move the cursor representation on the screen at the same time as the finger in the manner in which this representation of the cursor follows the finger. When the identification of the position of the finger with the position of the cursor has been made, the interface module will follow the movements of the finger and modify the coordinates of the cursor position depending on the position of the finger. When the finger is lifted from the touch screen the last stored position is recorded in a hard disk file and the set of these data are re-read each time the system starts to serve as a reference for adjusting the physical parameters of adjustment of the respective electronic cards with input or output level which are to be modified. Thus it is understood that using the screen of FIG. 8 system operating parameters such as the following can be controlled:

"master volume" level;
jukebox volume level;
auxiliary input (radio) volume level;
microphone volume level;
base level;
treble level;
balance adjustment.

Other graphics display modules can likewise fix the following parameters:

title price or number of titles for a predetermined value;
inactivity delay before starting the audio and video promotion mode;
inactivity delay before starting the auxiliary source (radio);
inactivity delay before starting the selection sampling mode;
the location (in seconds from the beginning) where to start sampling;
sample duration (in seconds).

All the values set using this control screen are backed up on disk and reread whenever the system is started.

The file containing the control values on disk is in a non-readable machine format. The file occupies only 128 octets of disk space in all.

With this new display the manager can likewise control all the settings which are possible with remote control. He can likewise take control of additional low level commands allowing for example definition of commands to be validated or invalidated on the remote control. He is also able to define a maximum of high and low levels for each system output source, these limits defining the range available on the remote control. Using this screen the manager can access the mode of new selection acquisitions by touching a button located on the touch screen which initiates execution of the NSAM statistics module. When the manager has succeeded in defining these commands as well as the system configuration, it is then enough to remove the key and the system returns automatically to the "in service" mode.

Figure 10:
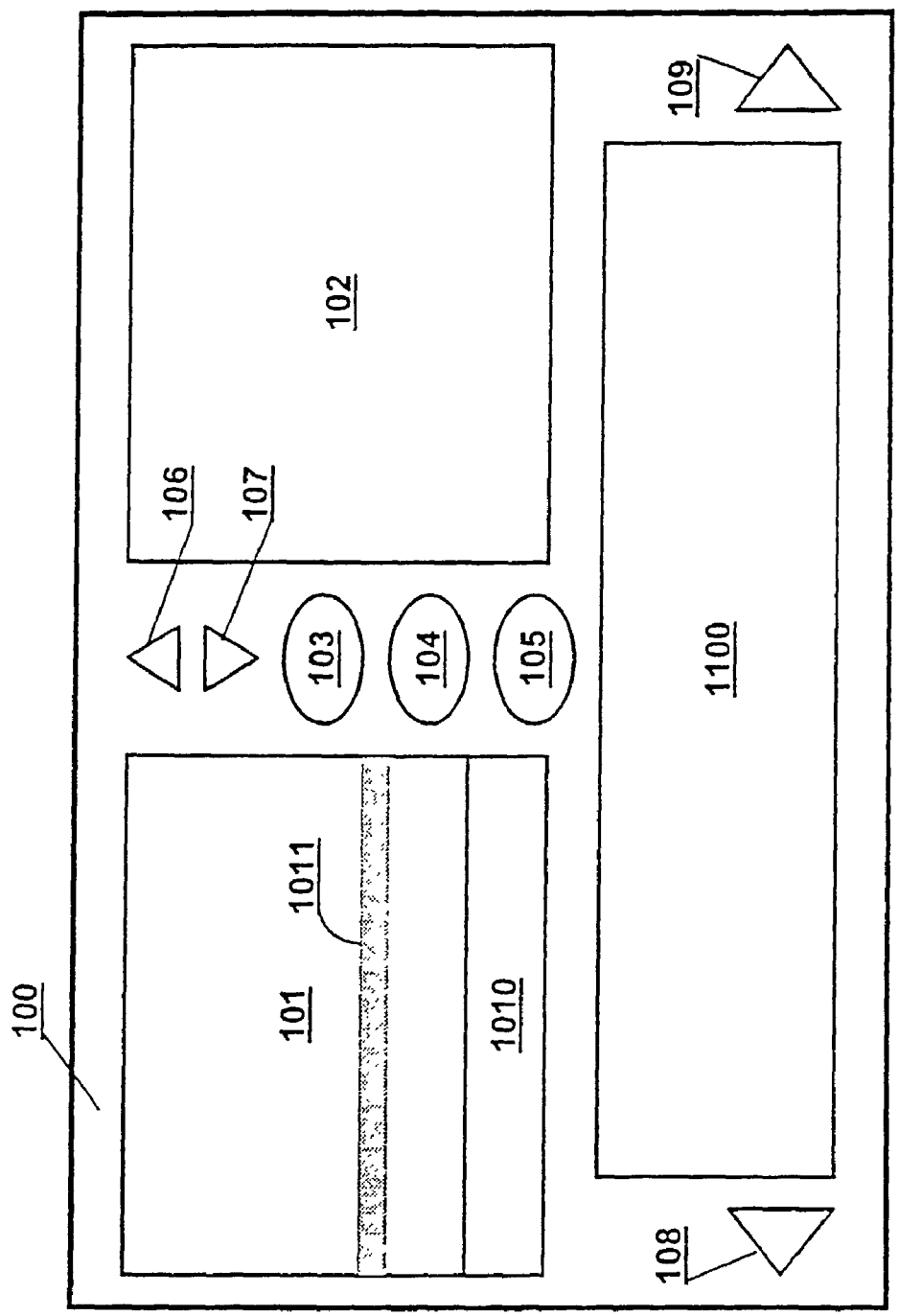
FIG. 10 shows the graphics display by the graphics module of the new selection acquisition mode module (NSAM)
Figure 11:
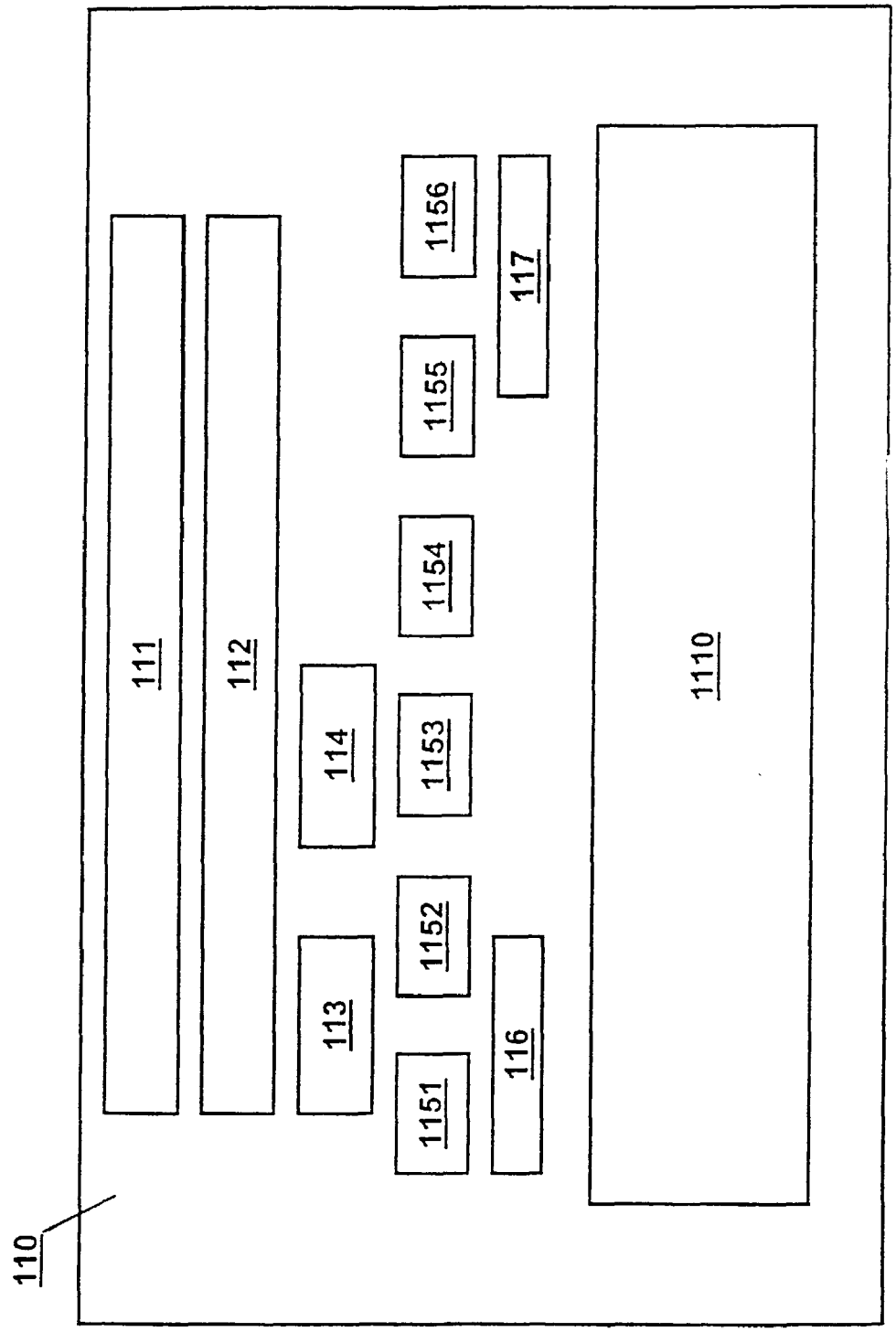
FIG. 11 shows a graphics submodule of the particular selection.

The NSAM module is the new selections acquisition mode module. This module represented in FIG. 10 includes a graphic module which allows display of window (100). This window incorporates three subwindows (101, 1010, 102), the first (101) in the form of a pull-down list allows the selection list to be scrolled by pressing the buttons of the pull-up arrows (106, 107). This selection list can only be displayed either after having displayed the category selection screen (FIG. 11), having first pressed button (105), title (1011) being highlighted by touching the title under consideration, or after having introduced in subwindow (1010) at least one character by means of keyboard (1100). Second window (102) makes it possible to display:

when selection control button (103) is pressed, the note "purchase in progress" and if the capacity of the hard disk memory is no longer enough, the note "insufficient memory"; a title list appears on this same window (102) corresponding to the insufficient memory space; these titles have been selected automatically in the statistics database according to the criterion of a title never heard or least heard; this list of proposed titles allows the manager to decide to delete them from the disk and thus to free memory space sufficient for the intended purchase to take place;

when "detail" button (104) is pushed, various information linked to the highlighted title appears in window (102), such as the price of the selected title, its length, the album name, the name of the artist or any other information characteristic of the selected title.

Button (103) allows control of the selection which is then downloaded. Button (104) allows display of the details on the selection. Third button (105) allows selection of the category of music or the selection to be controlled. The manager pressing this third button (105) allows display of the screen shown in FIG. 11 which will be described below. Finally, the screen of FIG. 10 likewise contains an alphanumeric keypad representing keyboard (1100) which allows the manager, by typing either the name of the album, artist or title written in subwindow (1010), to display in window (101) a list of titles more or less restricted depending on the criterion used and the control keys allowing display of the preceding screen by arrow (108) and the following screen by arrow (109). Programming interface module (153) for touch screen (33) includes various modules; each of the submodules corresponds to one of the aforementioned graphics modules. Thus, when the system operates the NSAM graphics module from FIG. 10 this graphics module is linked to corresponding graphics interface module (153) which allows zone (103) to be considered as a zone for initiating the command to subsequently call on the downloading function of the TSM module. Likewise this interface module (153) linked to graphics module NSAM allows touching of zone (105) to be considered the call of the graphics module allowing the display of FIG. 11.

Figure 12:
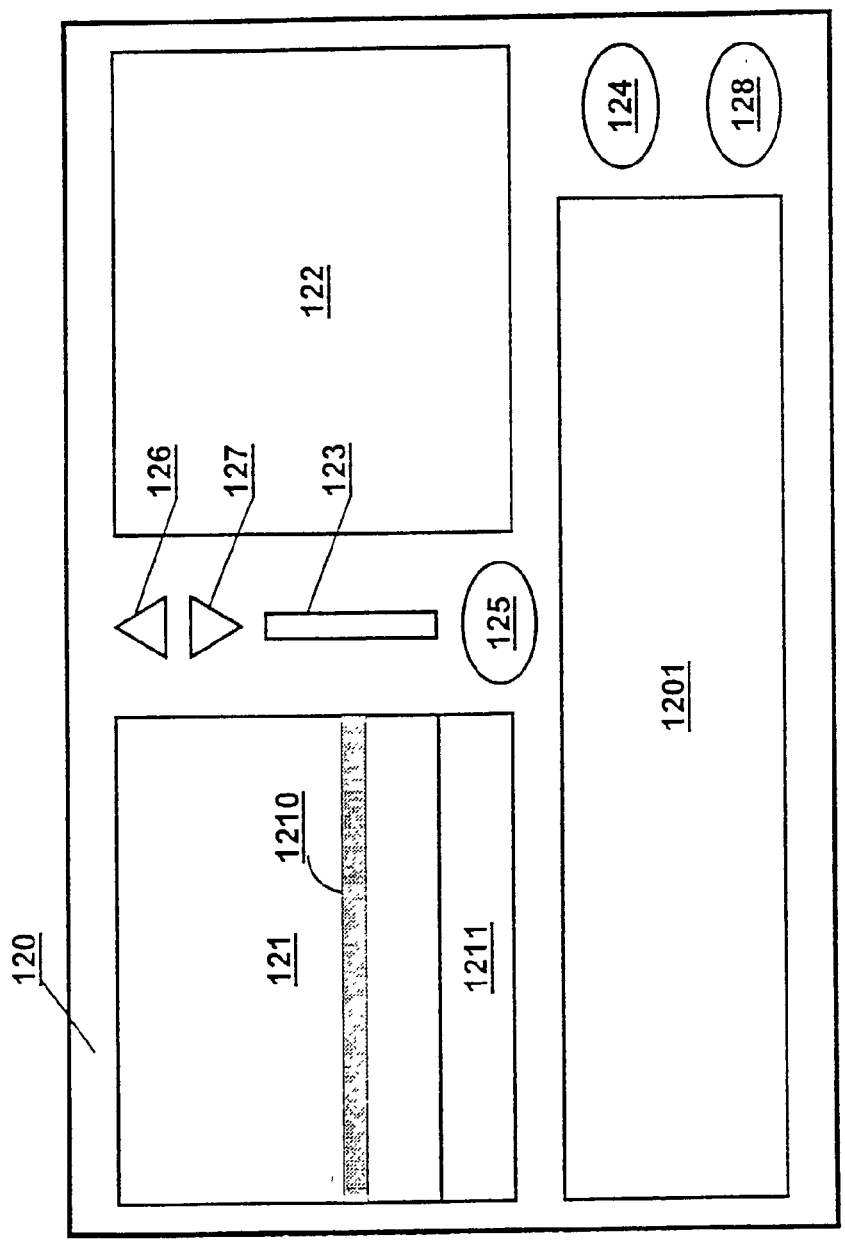
FIG. 12 shows the graphics module of the customer browsing and selection mode module (CBSM)
Figure 13:
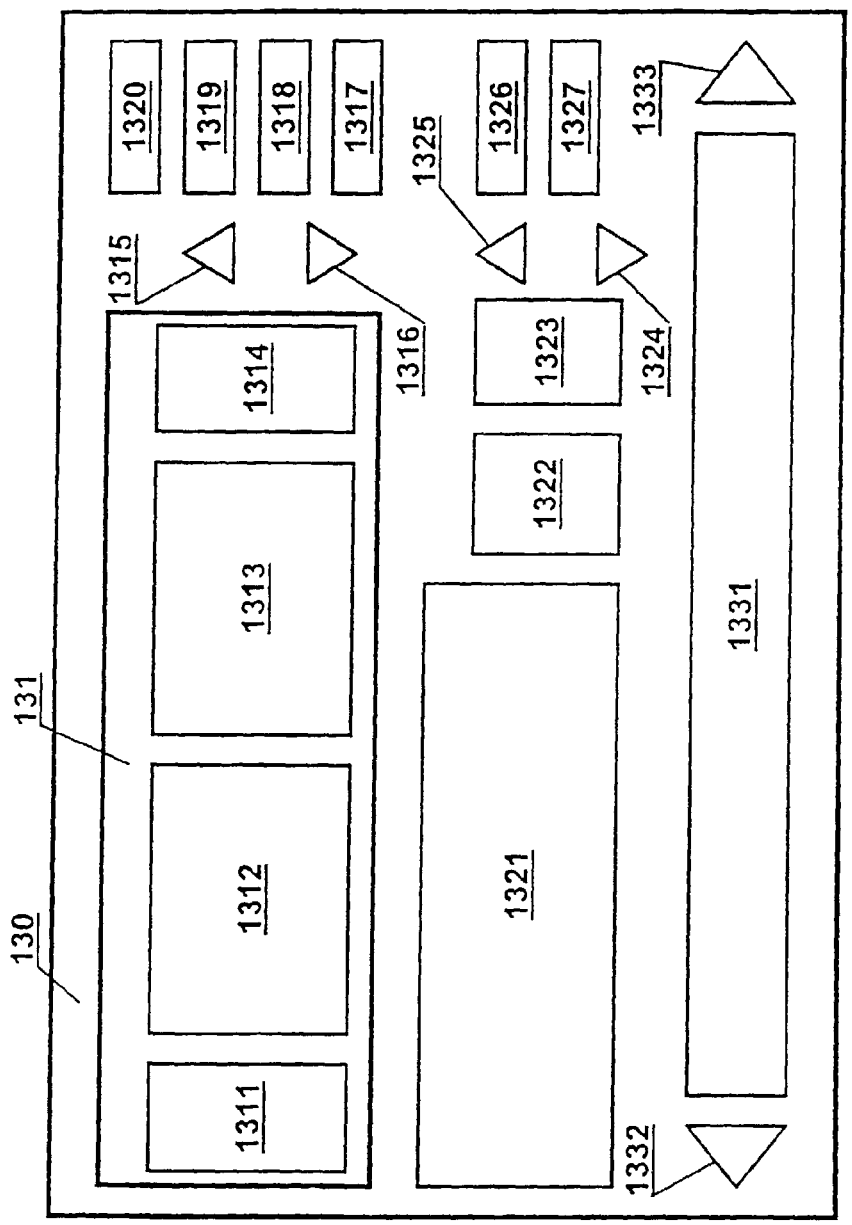
FIG. 13 shows a graphics submodule for statistics display which can be called when using the new selection acquisition mode module (NSAM).

The CBSM module is the customer browsing and selection mode module. Access to this module is triggered from the "in service" mode when the customer touches the screen. The display allows the user to view a menu of the screens provided for powerful browsing and to broadcast possible digitized messages broadcast at the same time as the menu or screen to guide the user in his choice of musical selections. One example of the graphics module of the customer browsing and selection mode module is shown in FIG. 12 in which window (120) includes three subwindows (121, 1211, 122), the first (121) being a pull-down subwindow. Pull-down of first window (121) is controlled by upper (126) and lower (127) pull-down arrows. As described above for the NSAM module, a title list can only appear in window (121) if a selection criterion has been introduced using keyboard (1201) connected to window (1211) of FIG. 12 or using window (110) triggered by category button (125) connected either to keyboard (1110) which can write an alphanumeric text in keypads (111, 112, 113, 114), or to touch zones (1151) to (1156) of window (110) shown in FIG. 11. Window (121) allows display of titles of selections in alphabetic order by song name. Window (122) allows display of the visual display unit corresponding to the song jacket, indicator (123) makes it possible to indicate credit or the absence of credit in the form of a level. This indicator (123) is graduated in number of possible selections. This indicator (123) indicates to the user if he has credit sufficient for one or more new selections or not, or in the opposite case encourages him to insert coins in the money changer. Button (125) allows selection of the song category and passage to the display of the following window shown in FIG. 11. Finally this CBSM graphics module likewise includes button (128) allowing successful triggering of the song display and button (124) which allows validation of the selection or selections for initiating their introduction into the queue or their immediate and successive performance if the queue is empty. Window (120) is completed by alphanumeric keyboard (1201) which makes it possible to directly enter the name of another singer or song title. Pressing category button (125) of FIG. 12 equivalent to (105) of FIG. 10 calls up a subroutine of the graphics module which triggers display of window (110) of FIG. 11 in which an alphanumeric keypad makes it possible to introduce, using alphanumeric keyboard (1110), the album name in zone (111), second alphanumeric keypad (112) makes it possible to introduce the name of the artist in zone (112), and third and fourth alphanumeric keypads (113, 114) allow introduction of a year or period and finally a line of buttons (1151 to 1156) allows selection respectively solely "rock and roll", "dance", "country", "rap", "jazz" music albums or music for karaoke. Finally, window (110) contains button (116) for cancellation in case of error, button (117) for validation of the choice of selection, allowing return to window (120). Within subwindow (121) there then appears a list of one to several titles depending on a selection criterion, the user selects the title which he wishes to hear by touching the pertinent title, it is highlighted (1210) and simultaneously subwindow (122) displays the visual display unit corresponding to the album jacket containing the selected title. The user need simply press button (124) which causes changing of the graphics screen by causing to appear window (90) in which he will see appear in subwindow (92) the title jacket which he has selected and he will immediately hear it if queue (94) was at zero, in the opposite case he will see appear the title jacket during performance and in keypad (94) the number of titles in the queue increased by the number of the titles which he has selected. By means of the MMM module the manager has access to the statistics database by moving arrow (109, FIG. 10) which causes graphics window (130) to appear which represents the statistics screen shown in FIG. 13, This statistics file is automatically transmitted to the central server using the telecommunications module (4) each time a link has been established between the jukebox and central server. This window (130) includes first zone (131) comprising a plurality of pull-down windows (1311, 1312, 1313, 1314) allowing each to display respectively the list of numbers of products (1311), titles (1312), artists (1313) and amounts paid (1314). Pull-down of these windows is accomplished by arrow (1315) to the top and arrow (1316) to the bottom. Graphics touch buttons (1317) to (1320) represent respectively the selection criteria: total of amounts deposited by titles in decreasing order of these amounts, list in alphabetical order of the successful titles, names of the artists, and all the titles. The manager by touching the line corresponding to a title causes to appear in window (1321) the number of times this title was selected and all the information on this title with display of the dates in window (1322) and time in window (1323). Graphics touch buttons (1326, 1327) define the selection criteria respectively by date and time. Arrows (1325, 1324) scroll the lines displayed in windows (1322, 1323) towards the top and bottom respectively. Window (1331) is reserved for specific messages transmitted by the central server to the jukebox manager, such as:

"attention you have only "X" minutes of music left in your memory space representing "Y" titles;
titles A, B, C and D are never selected, do you wish to change them?;
Coca Cola will be promoted from . . . to . . . ,
etc. . . .

Arrows (1332) and (1333) allow access to the preceding screen or following screen respectively.

Again, as before, for each graphics modules linked to a specific jukebox module, programming interface module (153) corresponding to touch screen (33) is linked such that touching the different zones corresponding to action buttons or pull-down arrows is correctly interpreted by this interface module (153). Likewise each graphics module will include a module which allows corresponding operation of database (16) which will be described in conjunction with FIG. 7 below. This operation of the database allowing, when the rock button is touched, for example successive display of different rock albums and names of rock artists available, this display being possible in the form of pull-down windows in window (101) of FIG. 10 or (121) of FIG. 12 according to whether the activation was done by the customer or manager.

The TSM module is the telecommunications services mode module between the central server and the audiovisual reproduction system. The module allows management of all management services available on the distribution network. All the tasks specific to telecommunications are managed like the background tasks of the system. These tasks always use only the processing time remaining once the system has completed all its foreground tasks. Thus, when the system is busy with one of its higher priority tasks, the telecommunications tasks automatically will try to reduce the limitations on system resources and recover all the microprocessor processing time left available.

The SSC module is the system security control module. This module manages security, each system is linked to a local controller system according to a preestablished time pattern for acquisition of the approval signal in the form of the registration number authorizing it to operate. In addition, if cheating has been detected or the system cannot communicate via the network, said system automatically stops working.

The SPMM module allows management of musical selections, songs or video queued by the system for execution in the order of selection.

Finally, the SMM module allows remote management of system settings by the manager using remote control.

The multitask operating system comprises the essential component for allowing simultaneous execution of multiple code fragments and for managing priorities between the various tasks which arise.

Figure 3:
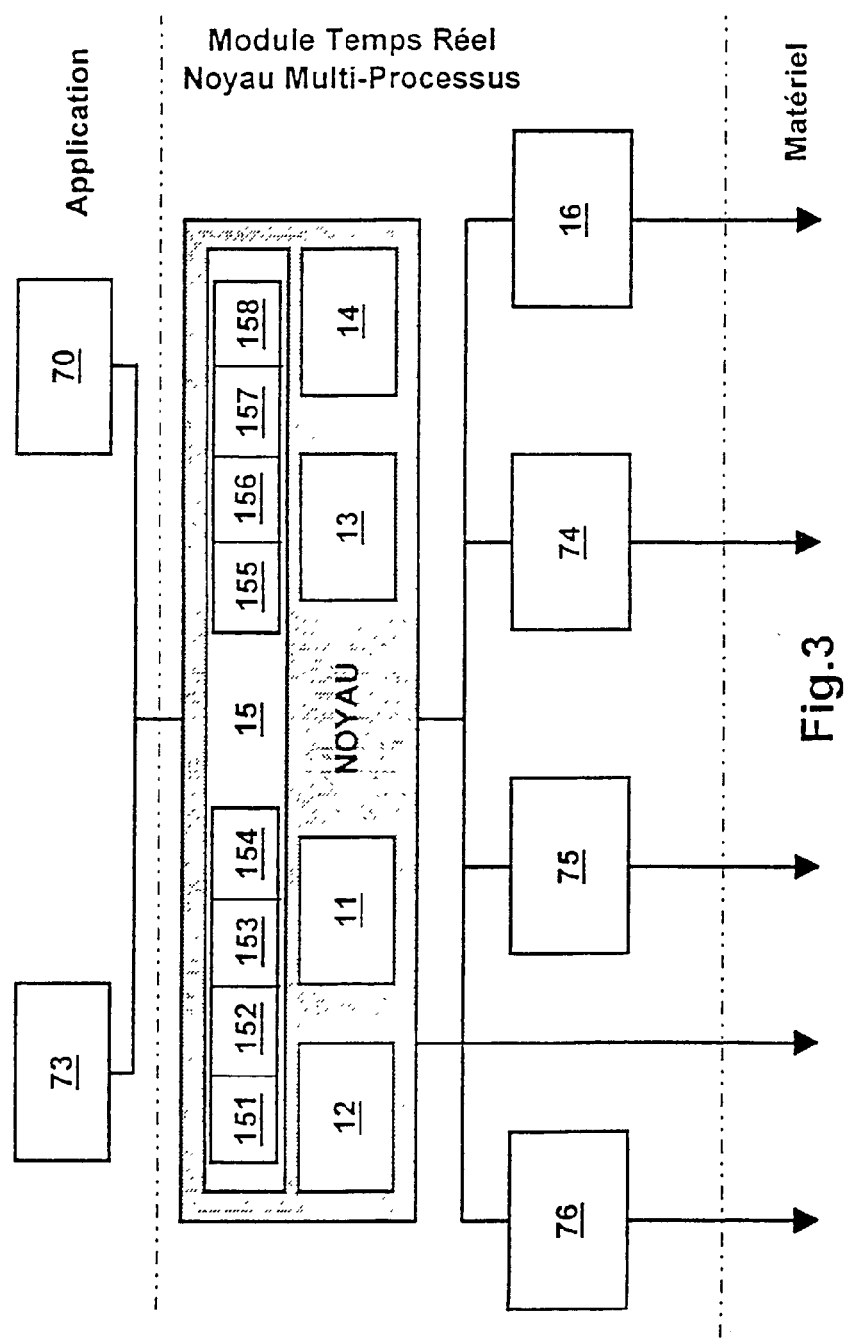
FIG. 3 shows the organization of the multitask system which manages the set of hardware and software.

This multitask operating system is organized as shown in FIG. 3 around a kernel comprising module (11) for resolving priorities between tasks, task scheduling module (12), serialization module (13), and process communications module (14). Each of the modules communicates with applications programming interfaces (15) and database (16). There are as many programming interfaces as there are applications. Thus, module (15) includes first programming interface (151) for key switch (32), second programming interface (152) for remote control (31), third programming interface (153) for touch screen (33), fourth programming interface (154) for keyboard (34), fifth programming interface (155) for payment device (35), sixth programming interface (156) for audio control circuit (5), seventh programming interface (157) for video control circuit (6), and last interface (158) for telecommunications control circuit (4).

Five tasks with a decreasing order of priority are managed by the kernel of the operating system, the first (76) for the video inputs/outputs has the highest priority, the second (75) of level two relates to audio, the third (74) of level three to telecommunications, the fourth (73) of level four to interfaces and the fifth (70) of level five to management. These orders of priority will be considered by priority resolution module (11) as and when a task appears and disappears. Thus, as soon as a video task appears, the other tasks underway are suspended, priority is given to this task and all the system resources are assigned to the video task. At the output, video task (76) is designed to unload the video files of the mass memory (21) alternately to one of two buffers (66, 67), while other buffer (67 or 66) is used by video controller circuit (6) to produce the display after data decompression. At the input, video task (76) is designed to transfer data received in telecommunications buffer (46) to mass storage (21). It is the same for audio task (75) on the one hand at the input between telecommunications buffer (46) and buffer (26) of mass memory (21) and on the other hand at the output between buffer (26) of mass memory (21) and one of two buffers (56, 57) of audio controller circuit (5).

Figure 4:
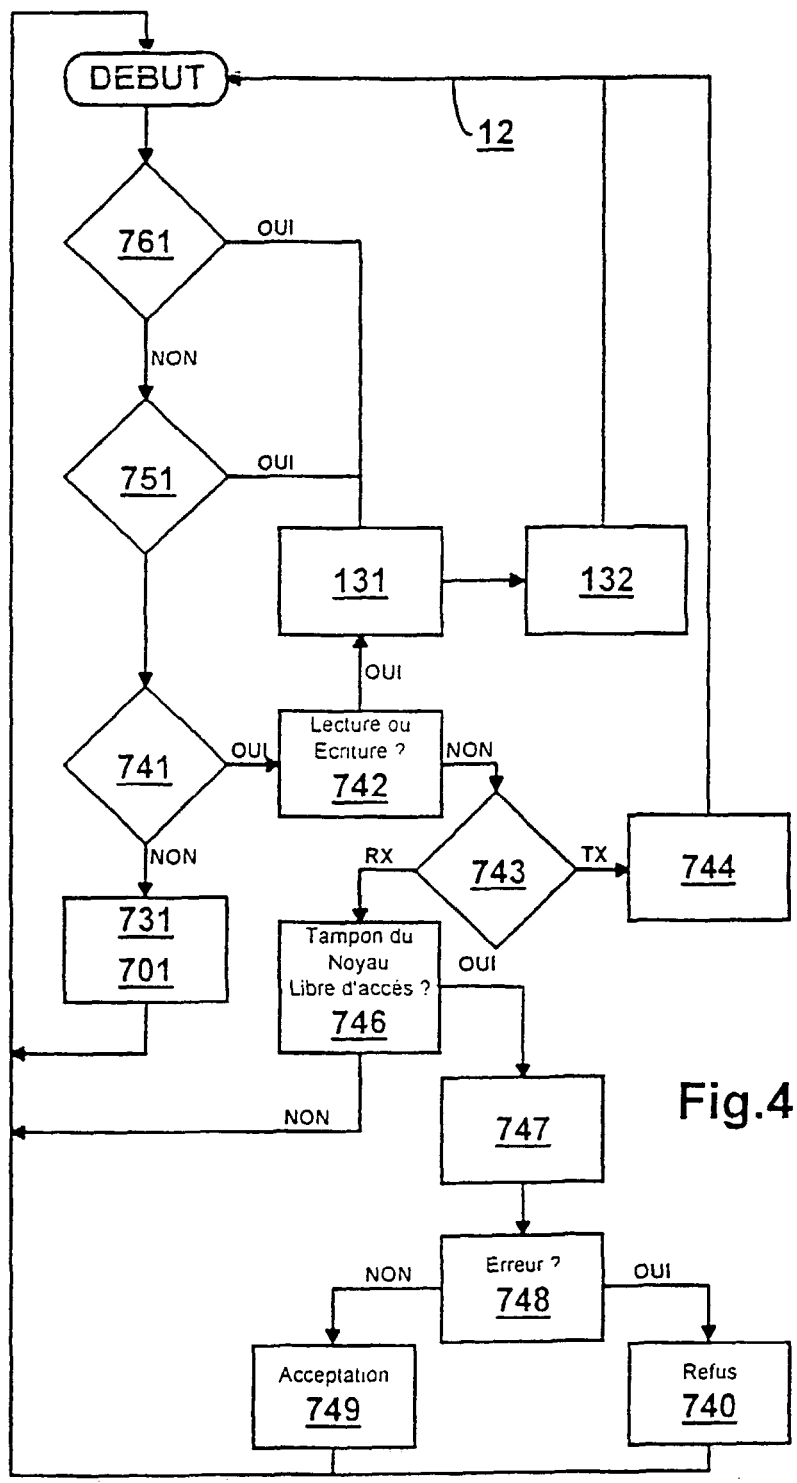
FIG. 4 shows a flowchart describing the operation of the multitask management system.

Task scheduling module (12) will now be described in conjunction with FIG. 4. In the order of priority this module performs first test (761) to determine if the video task is active, i.e., if one of the video buffers (66, 67) is empty. In the case of a negative response the task scheduling module passes to the following test which is second test (751) to determine if the audio task is active, i.e., if one of video buffers (56, 57) is empty. In the case of a negative response third test (741) determines if the communication task is active, i.e., if buffer (46) is empty. After a positive response to one of the tests, task scheduling module (12) at stage (131) fills memory access request queue (13) and at stage (132) executes this request by reading or writing between mass storage (21) and the buffer corresponding to the active task, then loops back to the first test. When test (741) on communications activity is affirmative, scheduler (12) performs test (742) to determine if it is a matter of reading or writing data in the memory. If yes, the read or write request is placed in a queue at stage (131). In the opposite case, the scheduler determines at stage (743) if it is transmission or reception and in the case of transmission sends by stage (744) a block of data to the central server. In the case of reception the scheduler verifies at stage (746) that the kernel buffers are free for access and in the affirmative sends a message to the central server to accept reception of a data block at stage (747), in the negative, the loops returns to the start tests. After receiving a block, error control (748) of the cyclic redundancy check type (CRC) is executed. The block is rejected at stage (740) in case of error or accepted at stage (749) in the opposite case by sending a corresponding message to the central server indicating that the block bearing a specific number is rejected or accepted, then loops back to the start tests. When there is no higher level task active, at stage (731 or 701) the scheduler processes interface or management tasks, then loops back to the start test.

Figure 5:
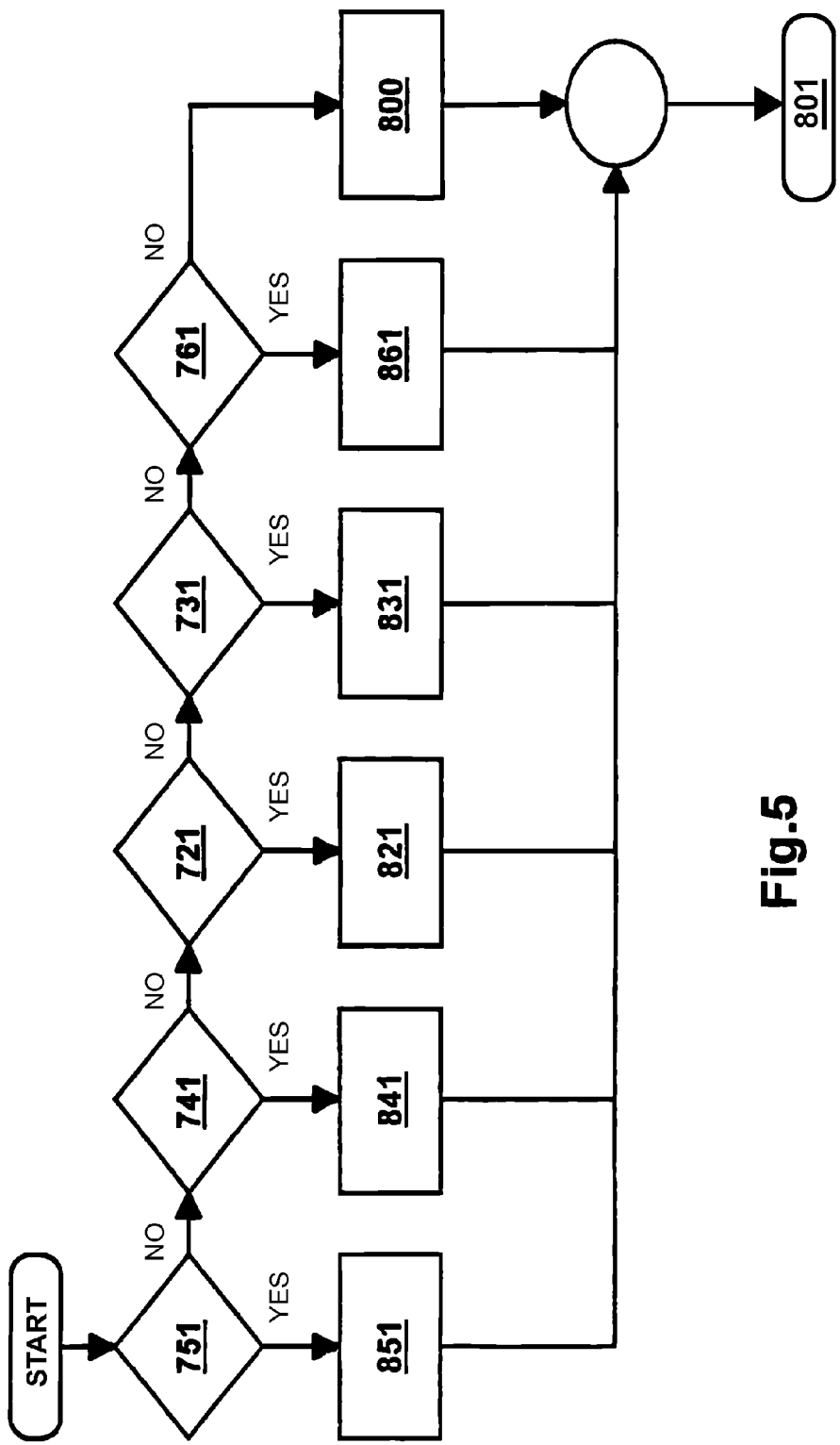
FIG. 5 shows a flowchart for verifying task activity.

Detection of an active task or ready task is done as shown in FIG. 5 by a test respectively (721 to 761) on each of respective hardware or software buffers (26) of the hard disk, (36) of the interface, (46) of telecommunications, (56 and 57) of audio, (66 and 67) of video which are linked to each of respective controller circuits (2, 3, 4, 5, 6) of each of the hardware devices linked to central unit (1). Test (721) makes it possible to see if the data are present in the disk input and output buffer, test (731) makes it possible to see if the data are present in the hardware or software buffers of the customer interface device, test (741) makes it possible to see if the data are present in software or hardware buffers of the telecommunications device, test (751) makes it possible to see if the data are present in software or hardware buffers for audio, test (761) makes it possible to see if the data are present in the software or hardware buffers of the video device. If one or more of these buffers are filled with data, scheduler (12) positions the respective status buffer or buffers (821) for the hard disk, (831) for the interface, (841) for telecommunications, (851) for audio, (861) for video corresponding to the hardware at a logic state indicative of the activity. In the opposite case the scheduler status buffers are returned at stage (800) to a value indicative of inactivity.

The system operating status is kept on hard disk.

Each time a notable event is triggered, the system immediately records it on hard disk.

Thus, in the case in which an electrical fault or hardware failure occurs, the system will accordingly restart exactly at the same location where it had been interrupted.

Events which trigger back-up of the operating status are:
insertion of money (crediting);
addition of a selection to the queue;
end of a selection (change from the selection currently being played).

The file is then in a machine format which can only be read by the unit and does not occupy more than 64 octets.

Figure 6:
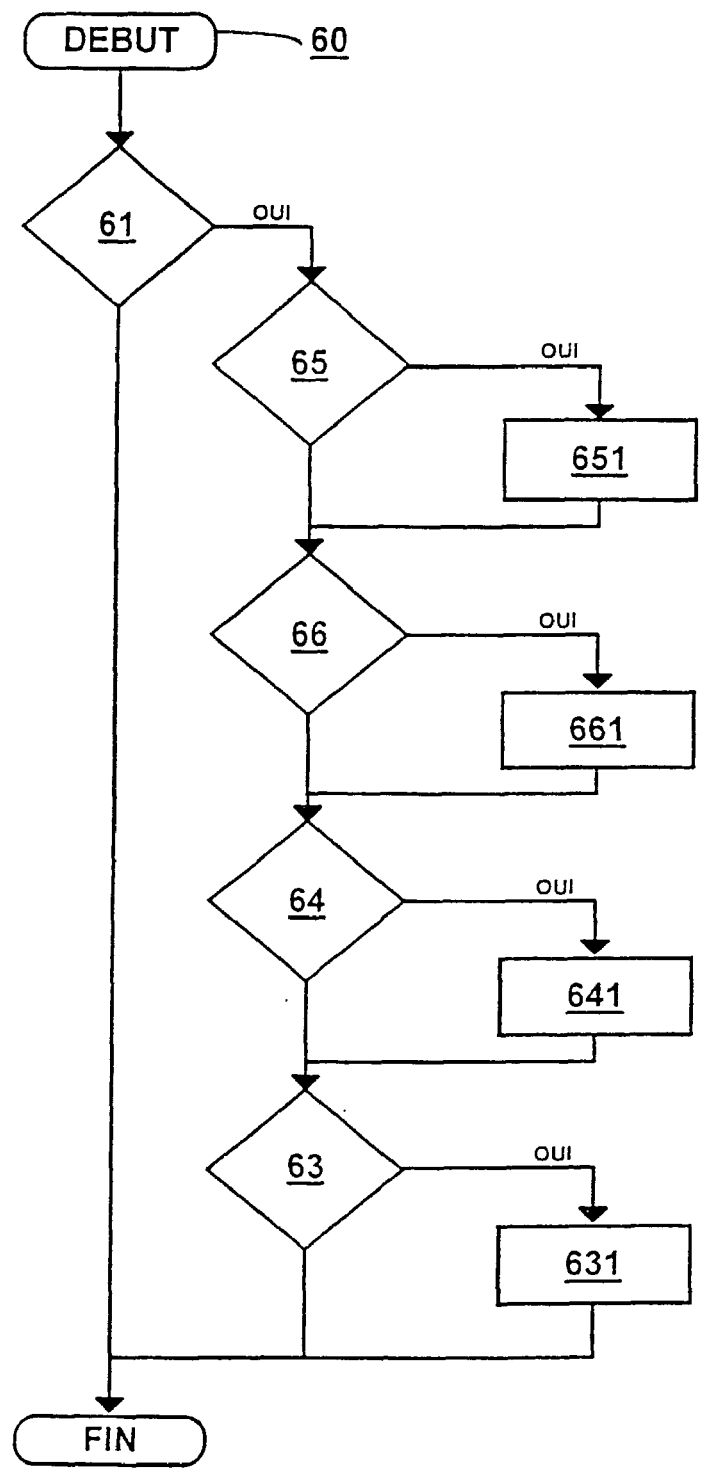
FIG. 6 shows the flowchart of selection queuing.

The number and type of active tasks is indicated to scheduler (12) by execution of the selection management module SPMM whose flowchart is shown in FIG. 6. The management exercised by this module begins with test (61) to determine if selections are in the queue.

Consequently, if test (61) on the queue determines that selections are waiting, when a customer chooses a title he wishes to hear, it is automatically written in a queue file of the system on hard disk.

Thus, no selection made will ever be lost in case of an electrical failure. The system plays (reproduces) the selection in its entirety before removing it from the queue file.

When the selection has been reproduced in its entirety, it is removed from the queue file and written in the system statistics file with the date and time of purchase as well as the date and time at which it was performed.

Immediately after transfer of the completed selection to the statistics file, the system checks if there are others in the queue file. If there is another, the system begins immediately to play the selection.

The total time transpired between the end of one selection and the start of the next is less than 0.5 seconds.

This delay can be prolonged using a button on the system control board.

Processing is continued by test (65) to determine if the selection contains an audio scenario. If yes, at stage (651) this scenario is written in the task queue of scheduler (12), If not, or after this entry, processing is continued by test (66) to determine if the selection contains moving images. If yes, the video scenario is written at stage (661) in the task queue of scheduler (12). If no or if yes after this entry, processing is continued by test (64) to determine if the selection contains still graphics. If yes, at stage (641) this graphics presentation scenario is written in the task queue of scheduler (12). If no or if yes after this entry, processing is continued by test (63) to determine if the selection contains an advertising scenario. If yes, at stage (631) the scenario is written in the task queue of scheduler (12). Thus scheduler (12) notified of uncompleted tasks can manage the progression of tasks simultaneously.

Due, on the one hand, to the task management mode assigning highest priority to the video task, on the other hand, to the presence of hardware or software buffers assigned to each of the tasks for temporary storage of data and to the presence of status buffers relative to each task, it has been possible to have all these tasks managed by a single central unit with a multitask operating system which allows video display, i.e., moving images compared to a graphics representation in which the data to be processed are less complex. This use of video presentation can likewise be done without adversely affecting audio processing by the fact that audio controller circuit (5) includes buffers large enough to store a quantity of compressed data sufficient to allow transfer of video data to one of video buffers (66, 67) during audio processing while waiting for the following transfer of audio data.

Figure 7:
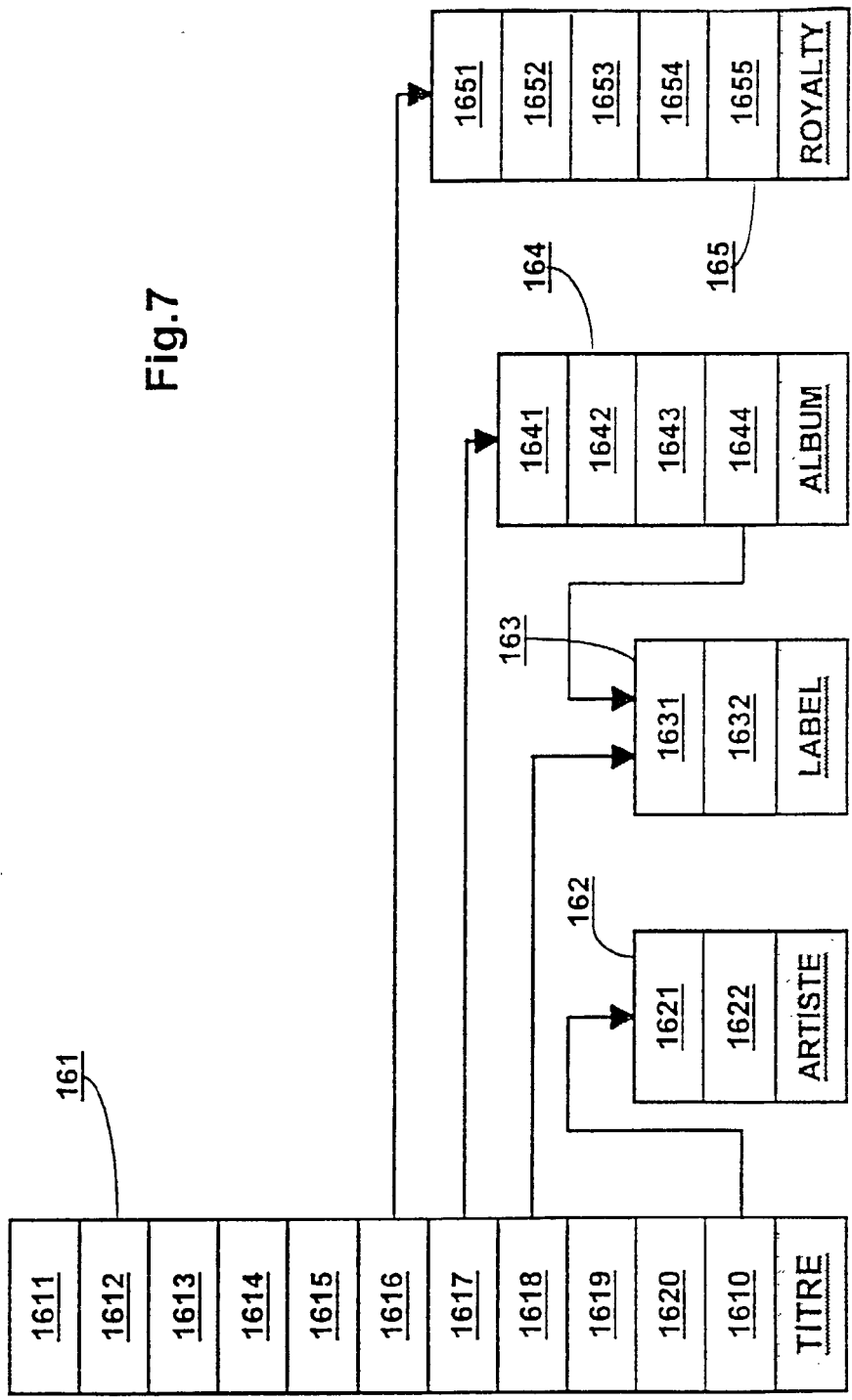
FIG. 7 shows a diagram of the organization of the database.

Moreover, the multitask operating system which includes a library containing a set of tools and services greatly facilitates operation by virtue of its integration in the storage means and the resulting high flexibility. In particular, for this reason it is possible to create a multimedia environment by simply and efficiently managing audio reproduction, video or graphics display and video animation. In addition, since the audiovisual data are digitized and stored in the storage means, much less space is used than for a traditional audiovisual reproduction system and consequently the congestion of the system according to the invention is clearly less. Database (16) is composed, as shown in FIG. 7, of several bases.

First base (161) with the titles of the audiovisual pieces, second (162) with the artists, third (163) with the labels, fourth (164) with albums, fifth (165) with royalties. First base (161) contains first item (1611) giving the title of the piece, second item (1612) giving the identification of the product, this identification being unique. Third item (1613) makes it possible to recognize the category, i.e., jazz, classical, popular, etc. Fourth item (1614) indicates the date of updating. Fifth item (1615) indicates the length in seconds necessary to play the piece.

Sixth item (1616) is a link to the royalties base. Seventh item (1617) is a link to the album. Eighth item (1618) is a link to the labels. Ninth item (1619) gives the purchase price for the jukebox manager;

Tenth item (1620) gives the cost of royalties for each performance of the piece;

Eleventh item (1610) is a link to the artist database, This link is composed of the identity of the artist. The artist database includes, besides the identity of the artist composed of item (1621), second item (1622) composed of the name of the artist or name of the group. The label database includes first item (1631) composed of the identity of the label, establishing the link to eighth item (1618) of the title database and second item (1632) composed of the name of the label. The album database contains a first item which is the identity of the album (1641) which constitutes the link to seventh item (1617) of the title base. Second item (1642) comprises the title, third item (1643) is composed of the date of updating of the album, and fourth item (1644) is composed of the label identity. The royalty base is composed of first item (1651) giving the identity of the royalties and corresponds to sixth item (1616) of the title base. Second item (1652) comprises the name of the individual receiving the royalties. Third item (1653) is composed of the destination address of the royalties. Fourth item (1654) is composed of the telephone and fifth item (1655) is composed of the number of a possible fax.

It is apparent that this database (16) thus makes it possible for the manager to keep up to date on costs, purchases of songs and royalties to be paid to each of the artists or groups of artists performing the songs or video, and likewise to display the statistics relating to playing of songs to make it easier for the manager to select new titles by deleting for example less profitable titles.

Any modification by one skilled in the art is likewise part of the invention. Thus, regarding buffers, it should be remembered that they can be present either physically in the circuit to which they are assigned or implemented by software by reserving storage space in the system memory.

The invention claimed is:

1. A jukebox apparatus, comprising:
a microprocessor;
a first memory area that stores audiovisual items playable on the jukebox apparatus in response to a request by a customer;
a second memory area that stores at least one system operating parameter of the jukebox apparatus;
a display for displaying video;
an audio arrangement configured to provide audio;
a communication system for enabling the jukebox device to communicate with an audiovisual distribution network; and
a multitasking operating system configured to enable simultaneous operation of the microprocessor, the display, audio arrangement, and the communication system,
wherein the multitasking system comprises a module configured to resolve priorities between tasks, a task scheduling module, and a selection management module configured to indicate the number and type of active tasks to the task scheduling module and configured to determine whether selections are waiting so as to automatically write these selections in a queue file of the system on a memory area of the jukebox apparatus,
wherein a status of the multitasking operating system is backed up, by the multitasking operating system automatically and without human intervention, to a file stored in the memory area of the jukebox apparatus each time a predetermined event occurs, wherein events that trigger back-up of the operating status include insertion of money, addition of a selection to the queue file, and an end of a selection,
wherein the display comprises a touch sensitive display portion operable to display a first screen for customer interaction, wherein the first screen comprises at least one displayed touch selectable option to assist the customer when searching and/or selecting a desired title,
wherein the touch sensitive display portion is further operable to display a second screen for manager interaction, the second screen being different from the first screen,
wherein the second screen comprises at least one displayed touch selectable option, corresponding to at least one physical system parameter of the jukebox apparatus, for selecting a corresponding physical system parameter to be modified, and
wherein the second screen for manager interaction is triggered when a key switch is manipulated, and wherein the second screen for manager interaction replaces the previously displayed first screen for customer interaction.

2. The jukebox apparatus of claim 1, wherein a manager module associated with the second screen is further operable to:

detect at least one point of contact with the touch sensitive display;

select at least one system operating parameter for modification, if the at least one point of contact corresponds to a selectable portion of at least one displayed touch selectable option; and modify, based on detected contact, the selected at least one system operating parameter.

3. The jukebox apparatus of claim 2, wherein the manager module is further operable to:

save, in the second memory area, a modified system operating parameter.

4. The jukebox apparatus of claim 3, wherein the manager module is further operable to detect a break in contact with the touch sensitive display, and wherein the manager module saves the modified system operating parameter when a break in contact is detected.

5. The jukebox apparatus of claim 2, wherein the manager module is further operable to detect a break in contact with the touch sensitive display, and wherein the manager module modifies the system operating parameter when a break in contact is detected.

6. The jukebox apparatus of claim 1, wherein the backed up status of the multitasking operating system is read by the jukebox apparatus each time the jukebox apparatus is started.

7. The jukebox apparatus of claim 1, wherein the file includes data regarding ordered and/or purchased audiovisual items.

8. A method of operating a jukebox apparatus, the method comprising:

providing a jukebox apparatus comprising:
- a microprocessor,
- a first memory area that stores audiovisual items playable on the jukebox apparatus in response to a request by a customer,
- a second memory area that stores at least one system operating parameter of the jukebox apparatus,
- a touch sensitive display for displaying video,
- an audio arrangement configured to provide audio,
- a communication system for enabling the jukebox device to communicate with an audiovisual distribution network, and
- a multitasking operating system configured to enable simultaneous operation of the microprocessor, the display, audio arrangement, and the communication system, wherein the multitasking operating system comprises a module configured to resolve priorities between tasks, a task scheduling module, and a selection management module configured to indicate the number and type of active tasks to the task scheduling module and configured to determine whether selections are waiting so as to automatically write these selections in a queue file of the system on a memory area of the jukebox apparatus;

backing up a status of the multitasking operating system, by the multitasking operating system automatically and without human intervention, to a file stored in the memory area of the jukebox apparatus each time a predetermined event occurs, wherein events that trigger back-up of the operating status include insertion of money, addition of a selection to the queue file, and an end of a selection;

displaying, on a touch sensitive portion of the display, a first screen for customer interaction, the first screen comprising at least one displayed touch selectable option to assist the customer when searching and/or selecting a desired title; and when a key switch is manipulated, triggering the display of a second screen for manager interaction on the touch sensitive portion of the display, the second screen being different from the first screen and comprising at least one displayed touch selectable option corresponding to at least one physical system parameter of the jukebox apparatus for modifying a corresponding physical system parameter to be modified, wherein the second screen for manager interaction replaces the previously displayed first screen for customer interaction when display thereof is triggered.

9. The method of claim 8, further comprising providing a manager module accessible via the second screen, the manager module being operable to:

(a) detect at least one point of contact with the touch sensitive display;

(b) select at least one system operating parameter for modification, if the at least one point of contact corresponds to a selectable portion of at least one displayed touch selectable option; and (c) modify, based on detected contact, the selected at least one system operating parameter.

10. The method of claim 9, wherein the manager module is further operable to save, in the second memory area, a modified system operating parameter.

11. The method of claim 10, wherein the manager module is further operable to detect a break in contact with the touch sensitive display, and wherein the manager module saves the modified system operating parameter when a break in contact is detected.

12. The method of claim 9, wherein the manager module is further operable to detect a break in contact with the touch sensitive display, and wherein the manager module modifies the system operating parameter when a break in contact is detected.

13. The method of claim 8, further comprising reading the backed up status of the multitasking operating system each time the jukebox apparatus is started.

14. The method of claim 8, wherein the file includes data regarding ordered and/or purchased audiovisual items.

* * * * *